US005374305A

United States Patent [19]

Glancy et al.

[11] Patent Number: 5,374,305

[45] Date of Patent: Dec. 20, 1994

[54] PRECURSOR COATING COMPOSITIONS CONTAINING WATER AND AN ORGANIC COUPLING SOLVENT SUITABLE FOR SPRAYING WITH SUPERCRITICAL FLUIDS AS DILUENTS

[75] Inventors: Charles W. Glancy, South Charleston; David C. Busby, Cross Lanes, both of W. Va.

[73] Assignee: Union Carbide Chemicals & Plastics Technology Corporation, Danbury, Conn.

[21] Appl. No.: 683,497

[22] Filed: Apr. 10, 1991

Related U.S. Application Data

[63] Continuation of Ser. No. 327,274, Mar. 22, 1989, abandoned.

[51] Int. Cl.[5] .................... C09D 7/14; C09D 201/00

[52] U.S. Cl. .................... 106/287.23; 106/287.25; 106/287.26; 106/311; 524/104; 524/107; 524/211; 524/214; 524/215; 524/377

[58] Field of Search .................... 106/186, 196, 287.26, 106/287.23, 287.25, 311; 524/104, 107, 211, 214, 215, 377

[56] References Cited

U.S. PATENT DOCUMENTS

| | | | |
|---|---|---|---|
| 4,124,528 | 11/1978 | Modell | 210/186 |
| 4,189,914 | 2/1980 | Marek et al. | 431/2 |
| 4,375,387 | 3/1983 | deFilippi et al. | 210/511 |
| 4,582,731 | 4/1986 | Smith | 427/421 |
| 4,619,735 | 10/1986 | Norton | 162/158 |
| 4,680,204 | 7/1987 | Das et al. | 427/409 |
| 4,734,227 | 3/1988 | Smith | 264/13 |
| 4,734,451 | 3/1988 | Smith | 524/493 |
| 4,737,384 | 4/1988 | Murthy et al. | 427/369 |

FOREIGN PATENT DOCUMENTS

| | | |
|---|---|---|
| 2603664 | 8/1977 | Germany . |
| 2853066 | 6/1980 | Germany . |
| 55-84328 | 6/1980 | Japan . |
| 58-168674 | 10/1983 | Japan . |
| 59-16703 | 1/1984 | Japan . |
| 62-152505 | 7/1987 | Japan . |
| 868051 | 4/1988 | South Africa . |

OTHER PUBLICATIONS

Francis, A. W., "Ternary Systems of Liquid Carbon Dioxide", J. Phys. Chem. 58:1099, Dec., 1954.

Smith, R. D., et al., "Direct Fluid Injection Interface for Capillary Supercritical Fluid Chromatography–Mass Spectrometry" J. Chromatog. 247 (1982):231–243 no month.

Krukonis, V., "Supercritical Fluid Nucleation of Difficult-to-Comminute Solids", paper presented at 1984 Annual Meeting, AIChE, San Francisco, Calif., Nov. 25–30, 1984.

Dandage, D. K., et al., "Structure Solubility Correlations: Organic Compounds and Dense Carbon Dioxide Binary Systems", Ind. Eng. Chem. Prod. Res. Dev. 24: 162–166 (1985) no month.

Matson, D. W., et al., "Production of Powders and Films by the Rapid Expansion of Supercritical Solutions", J. Materials Science 22: 1919–1928 (1987).

McHugh, M. A. et al., "Supercritical fluid Extraction, Principles and Practice", Butterworth Publishers (1986) Contents and Appendix*.

Cobbs, W. et al., "High Solids Coatings Above 80% By Volume", Water-Borne & High Solids Coatings Symposium, Mar. 1980.

Matson, D. W. et al., "Production of Fine Powders by the Rapid Expansion of Supercritical Fluid Solutions", Advances in Ceramics, vol. 21, pp. 109–121 (1987)*.

Kitamura, Y., et al., "Critical Superheat for Flashing of Superheated Liquid Jets", Ind. Eng. Chem. Fund. 25:206–211 (1986)*.

Petersen, R. C. et al., "The Formation of Polymer Fibers From the Rapid Expansion of SCF Solutions" Pol. Eng & Sci. (1987)* vol. 27, p. 1693.

*Primary Examiner*—David Brunsman
*Attorney, Agent, or Firm*—G. L. Coon

[57] ABSTRACT

The present invention relates to precursor coating compositions containing water and at least one organic solvent which are particularly suitable for being admixed with at least one supercritical fluid used as a viscosity reduction diluent and then spraying this resultant liquid mixture of supercritical fluid and precursor coating composition onto a substrate to be coated. Processes for spraying this precursor mixture are also disclosed.

3 Claims, 4 Drawing Sheets

PRECURSOR COATING COMPOSITIONS CONTAINING WATER AND AN ORGANIC COUPLING SOLVENT SUITABLE FOR SPRAYING WITH SUPERCRITICAL FLUIDS AS DILUENTS

This application is a continuation of prior U.S. application Ser. No. 327,274 filed on Mar. 22, 1989, now abandoned.

RELATED PATENT APPLICATIONS

This application contains subject matter related to application Ser. No. 133,068, filed Dec. 21, 1987, which application is a continuation-in-part of application Ser. No. 883,156, filed Jul. 8, 1986, now abandoned. This application also contains subject matter related to U.S. patent applications Ser. No. 218,896, filed Jul. 14, 1988; and Ser. No. 218,910, filed Jul. 14, 1988.

FIELD OF THE INVENTION

This invention, in general, pertains to the field of coating compositions. More specifically, the present invention relates to precursor coating compositions, containing water and at least one organic coupling solvent, which are particularly suitable for being admixed with at least one supercritical fluid used as a viscosity reduction diluent. The resultant admixed liquid mixture of supercritical fluid and precursor coating composition can then be sprayed onto a substrate to be coated.

BACKGROUND OF THE INVENTION

Prior to the present invention, the liquid spray application of coatings, such as lacquers, enamels and varnishes, was effected solely through the use of organic solvents as viscosity reduction diluents. However, because of increased environmental concern, efforts have been directed to reducing the pollution resulting from painting and finishing operations. For this reason there has been a great deal of emphasis placed on the development of new coatings technologies which diminish the emission of organic solvent vapors. A number of technologies have emerged as having met most but not all of the performance and application requirements, and at the same time meeting emission requirements and regulations. They are: (a) powder coatings, (b) water-borne dispersions, (c) water-borne solutions, (d) non-aqueous dispersions, and (e) high solids coatings. Each of these technologies has been employed in certain applications and each has found a niche in a particular industry. However, at the present time, none has provided the performance and application properties that were initially expected.

Powder coatings, for example, while providing ultra low emission of organic vapors, are characterized by poor gloss or good gloss with heavy orange peel, poor distinctness of image gloss (DOI), and poor film uniformity. Moreover, to obtain even these limited performance properties generally requires excessive film thicknesses and/or high curing temperatures. Pigmentation of powder coatings is often difficult, requiring at times milling and extrusion of the polymer-pigment composite mixture followed by cryogenic grinding. In addition, changing colors of the coating often requires its complete cleaning, because of dust contamination of the application equipment and finishing area.

Water-borne coatings are very difficult to apply under conditions of high relative humidity without serious coating defects. These defects result from the fact that under conditions of high humidity, water evaporates more slowly than the organic cosolvents of the coalescing aid, and as might be expected in the case of aqueous dispersions, the loss of the organic cosolvent/coalescing aid interferes with film formation. Poor gloss, poor uniformity, and pin holes unfortunately often result. Additionally, water-borne coatings are not as resistant to corrosive environments as are the more conventional solvent borne coatings.

Coatings applied with organic solvents at high solids levels avoid many of the pitfalls of powder and water-borne coatings. However, in these systems the molecular weight of the polymer has been decreased and reactive functionality has been incorporated therein so that further polymerization and crosslinking can take place after the coating has been applied. It has been hoped that this type of coating will meet the ever-increasing regulatory requirements and yet meet the most exacting coatings performance demands. However, there is a limit as to the ability of this technology to meet the performance requirement of a commercial coating operation. Present high solids systems have difficulty in application to vertical surfaces without running and sagging of the coating. Often, they are also prone to cratering and pin holing of the coating. If they possess good reactivity, they often have poor shelf and pot life. However, if they have adequate shelf stability, they cure and/or crosslink slowly or require high temperature to effect an adequate coating on the substrate.

Clearly, what is needed is an environmentally safe, non-polluting diluent that can be used to thin very highly viscous polymer and coatings compositions to liquid spray application consistency. Such a diluent would allow utilization of the best aspects of organic solvent borne coatings applications and performance while reducing the environmental concerns to an acceptable level. Such a coating system could meet the requirements of shop- and field-applied liquid spray coatings as well as factory-applied finishes and still be in compliance with environmental regulations.

Such a needed diluent has now been found and is discussed in the aforementioned related applications which teach, among other things, the utilization of supercritical fluids, such as supercritical carbon dioxide fluid, as diluents in highly viscous organic solvent borne and/or highly viscous non-aqueous dispersions coatings compositions to dilute these compositions to application viscosity required for liquid spray techniques.

U.S. patent application Ser. No. 133,068, filed Dec. 21, 1987, to Hoy, et al., disclose processes and apparatus for the liquid spray application of coatings to a substrate that minimize the use of environmentally undesirable organic diluents. The broadest process embodiment of that application involves:

(1) forming a liquid mixture in a closed system, said liquid mixture comprising:
   (a) at least one polymeric compound capable of forming a coating on a substrate; and
   (b) at least one supercritical fluid, in at least an amount which when added to (a) is sufficient to render the viscosity of said mixture of (a) and (b) to a point suitable for spray application; and
(2) spraying said liquid mixture onto a substrate to form a liquid coating thereon.

That application is also directed to a liquid spray process in which at least one active organic solvent (c) is admixed with (a) and (b) above prior to the liquid spray application of the resulting mixture to a substrate.

The preferred supercritical fluid is supercritical carbon dioxide. The process employs an apparatus in which the mixture of the components of the liquid spray mixture can be blended and sprayed onto an appropriate substrate. The apparatus contains (1) means for supplying at least one polymeric compound capable of forming a continuous, adherent coating;
(2) means for supplying at least one active organic solvent;
(3) means for supplying supercritical carbon dioxide fluid;
(4) means for forming a liquid mixture of components supplied from (1)-(3); and
(5) means for spraying said liquid mixture onto a substrate.

The apparatus may also provide for (6) means for heating any of said components and/or said liquid mixture of components. U.S. patent application Ser. No. 133,068 demonstrates the use of supercritical fluids, such as supercritical carbon dioxide fluid, as diluents in highly viscous organic solvent borne and/or highly viscous non-aqueous dispersions coatings compositions to dilute the compositions to application viscosity required for liquid spray techniques. It further demonstrates that the method is generally applicable to all organic solvent-borne coatings systems.

Copending U.S. application Ser. No. 218,910, filed Jul. 14, 1988, is directed to a liquid coatings application process and apparatus in which supercritical fluids, such as supercritical carbon dioxide fluid, are used to reduce to application consistency, viscous coatings compositions to allow for their application as liquid sprays. The coatings compositions are sprayed by passing the composition under pressure through an orifice into the environment of the substrate.

In particular, the process of U.S. application Ser. No. 218,910 for liquid spray application of coatings to a substrate comprises:

(1) forming a liquid mixture in a closed system, said liquid mixture comprising:
   (a) at least one polymeric component capable of forming a coating on a substrate; and
   (b) a solvent component containing at least one supercritical fluid, in at least an amount which when added to (a) is sufficient to render the viscosity of said mixture to a point suitable for spray application; and
(2) spraying said liquid mixture onto a substrate to form a liquid coating thereon by passing the mixture under pressure through an orifice into the environment of the substrate to form a liquid spray.

U.S. application Ser. No. 218,895, filed Jul. 14, 1988, is directed to a process and apparatus for coating substrates by a liquid spray in which 1) supercritical fluid, such as supercritical carbon dioxide fluid, is used as a viscosity reduction diluent for coating formulations, 2) the mixture of supercritical fluid and coating formulation is passed under pressure through an orifice into the environment of the substrate to form the liquid spray, and 3) the liquid spray is electrically charged by a high electrical voltage relative to the substrate.

In particular, the process of U.S. application Ser. No. 218,895 for electrostatic liquid spray application of coatings to a substrate comprises:

(1) forming a liquid mixture in a closed system, said liquid mixture comprising:
   (a) at least one polymeric component capable of forming a coating on a substrate; and
   (b) a solvent component containing at least one supercritical fluid, in at least an amount which when added to (a) is sufficient to render the viscosity of said mixture to a point suitable for spray application;
(2) spraying said liquid mixture onto a substrate to form a liquid coating thereon by passing the mixture under pressure through an orifice into the environment of the substrate to form a liquid spray; and
(3) electrically charging said liquid spray by a high electrical voltage relative to the substrate and electric current.

The use of supercritical fluids as a transport medium for the manufacture of surface coatings is well known. German patent application 28 53 066 describes the use of a gas in the supercritical state as the fluid medium containing the solid or liquid coating substance in the dissolved form. In particular, the application addresses the coating of porous bodies with a protectant or a reactive or nonreactive decorative finish by immersion of the porous body in the supercritical fluid coupled with a pressure drop to effect the coating. The most significant porous bodies are porous catalysts. However, the applicant characterizes fabrics as porous bodies.

Smith, U.S. Pat. No. 4,582,731, patented Apr. 15, 1986, and U.S. Pat. No. 4,734,451, patented Mar. 29, 1988, describe forming a supercritical solution which includes a supercritical fluid solvent and a dissolved solute of a solid material and spraying the solution to produce a "molecular spray." A "molecular spray" is defined as a spray "of individual molecules (atoms) or very small clusters of the solute." The Smith patents are directed to producing fine films and powders. The films are used as surface coatings.

Coating formulations are commonly applied to a substrate by passing the coating formulation under pressure through an orifice into air in order to form a liquid spray, which impacts the substrate and forms a liquid coating. In the coatings industry, three types of orifice sprays are commonly used; namely, air spray, airless spray, and air-assisted airless spray.

Air spray uses compressed air to break up the liquid coating formulation into droplets and to propel the droplets to the substrate. The most common type of air nozzle mixes the coating formulation and high-velocity air outside of the nozzle to cause atomization. Auxiliary air streams are used to modify the shape of the spray. The coating formulation flows through the liquid orifice in the spray nozzle with relatively little pressure drop. Siphon or pressure feed, usually at pressures less than 18 psi, are used, depending upon the viscosity and quantity of coating formulation to be sprayed.

Airless spray uses a high pressure drop across the orifice to propel the coating formulation through the orifice at high velocity. Upon exiting the orifice, the high-velocity liquid breaks up into droplets and disperses into the air to form a liquid spray. Sufficient momentum remains after atomization to carry the droplets to the substrate. The spray tip is contoured to modify the shape of the liquid spray, which is usually a round or elliptical cone or a flat fan. Turbulence promoters are sometimes inserted into the spray nozzle to aid atomization. Spray pressures typically range from 700 to 5000 psi. The pressure required increases with fluid viscosity.

Air-assisted airless spray combines features of air spray and airless spray. It uses both compressed air and high pressure drop across the orifice to atomize the coating formulation and to shape the liquid spray, typically under milder conditions than each type of atomization is generated by itself. Generally the compressed air pressure and the air flow rate are lower than for air spray. Generally the liquid pressure drop is lower than for airless spray, but higher than for air spray. Liquid spray pressures typically range from 200 to 800 psi. The pressure required increases with fluid viscosity.

Air spray, airless spray, and air-assisted airless spray can also be used with the liquid coating formulation heated or with the air heated or with both heated. Heating reduces the viscosity of the liquid coating formulation and aids atomization.

In general, coating compositions are formulated to help minimize the coating defects that may occur after the coating composition has been sprayed by any of the above means onto the substrate and then dried. Such defects include, but are certainly not limited to, orange peel conditions, runs or sags, pin holing and solvent pops, fish eyes, blistering, and the like, all of which are well known to those skilled in this art.

Indeed, some coating formulations are provided in concentrated form, that is, with a relatively high solids content, so that they may be custom tailored on site by the user. Thus, the user adds an appropriate amount of a particular solvent mixture to accommodate a particular end use spraying condition which may include variable wind conditions, ambient temperatures, drying conditions, humidity, and other such spraying condition factors.

While the above-noted related patent applications all utilize supercritical fluids as a diluent to help reduce the viscosity of highly viscous organic solvent-borne and/or highly viscous non-aqueous dispersions coating compositions so as to facilitate the application of these compositions by liquid spray techniques, and by doing so, desirably reduce the amount of organic solvent which would otherwise be used, the overall objective, of course, is still to obtain a coated substrate having a uniform, smooth, continuous coating and substantially none of the above-noted defects.

For obvious reasons, none of the prior art coating compositions have been formulated with the intent of having these compositions combined with a supercritical fluid as a diluent and then spraying the resultant admixed liquid mixture through an orifice and onto a substrate to form a liquid coating which is then dried and/or cured.

Indeed, prior to the inventions described in the above-noted related applications and the present invention, it was unknown how a high concentration of highly volatile supercritical fluid, such as supercritical carbon dioxide fluid, would affect formation of a liquid spray containing a solids fraction; a diluent fraction in which said solids fraction is dissolved, suspended or dispersed, and a portion of the supercritical fluid. A spray mixture undergoes a large and rapid drop in pressure as it goes through the orifice. Accordingly, one of ordinary skill in the art could theorize that the supercritical spray mixture would produce a foam like shaving cream instead of a spray, because nucleation to form gas bubbles would be so rapid and intense. Alternatively, one of ordinary skill in the art could also expect that the spray mixture would produce a mist or fog of microdroplets instead of a spray, because atomization would be so intense. Another result that one could theorize is that the spray mixture would produce a spray of bubbles instead of droplets. Furthermore, even if a spray were formed, it would have been expected that the sudden and intense cooling that accompanies rapid depressurization and expansion of a supercritical fluid would cause the liquid droplets to freeze solid. For example, it is commonly known that the spray from carbon dioxide fire extinguishers produces solid dry ice particles.

In the event that formation of a liquid spray were achieved, there is no assurance that the spray could be used to produce quality coherent polymeric coatings on a substrate. One of ordinary skill in the art could surmise that the liquid droplets would be so small or have so little momentum that they could not be deposited well onto the substrate. One could also theorize that foaming droplets or supercritical fluid dissolved in the coating would produce a layer of foam on the substrate or a coating full of bubbles when these characteristics were not desired in the coating. The liquid coating droplets that are deposited onto the substrate would have a much higher viscosity than the material that was sprayed, because they would have lost most of the supercritical fluid diluent and they would be at a lower temperature. Furthermore, the coating material would contain less volatile organic solvent than normal. Therefore, it is not unreasonable to expect that higher viscosity would prevent or hinder coalescence of the deposited droplets to form a coherent liquid coating; that it would reduce how much the droplets spread out on the substrate, so that thin coatings could not be produced; and that it would reduce the surface flow that produces a smooth coating. One can further theorize that moisture would condense onto the droplets and harm the coating, because the spray would be cooled below the dew point.

Surprisingly, however, it has been shown, as discussed in application Ser. No. 883,156 noted above, that liquid sprays can indeed be formed by using supercritical fluids as viscosity reduction diluents and that such sprays can be used to deposit quality coherent polymeric coatings onto substrates.

However, after admixing the highly viscous organic solvent borne and/or highly viscous non-aqueous dispersions coating compositions with supercritical fluids as a diluent to help reduce the viscosity, it may still be desirable to reduce the viscosity even further but keep the overall amount of supercritical fluid used substantially the same. Alternatively, it may also be desirable to maintain (or lower) the viscosity of the admixed coating composition and maintain the overall amount of supercritical fluids used substantially the same, but still want to reduce even further the amount of organic solvent in the admixed coating composition.

More specifically, there may be coating compositions whose initial viscosity is so high that the amount of supercritical fluids that can be admixed with such compositions, without undesirably causing a two phase separation, is insufficient to reduce the viscosity to the point where such composition can properly be sprayed.

Alternatively, since it is known that high molecular weight polymers generally provide finished coatings having better exterior durability, toughness, strength and solvent resistance, it may be desirable to use such a high molecular weight polymer in a coating composition in lieu of a similar but lower molecular weight polymer that may be there. However, the use of such a high molecular weight polymer introduces an increase in the overall viscosity of the coating composition. This increase in viscosity may be such that the amount of supercritical fluids now needed to reduce the viscosity of the composition to a point suitable for spray application may not be obtainable without breaking up the composition into two phases.

Still further, for a given highly viscous coating composition containing a particular amount of polymeric component and an organic or non-aqueous solvent, respectively, it may be desirable to reduce the amount of such volatile solvents even further. Of course, such a reduction in solvent would inherently result in a corresponding increase in the overall viscosity of the coating composition. Here again, the increase in viscosity may be such that the amount of supercritical fluids needed to now reduce the viscosity of the composition to a point suitable for spray application may not be obtainable.

Clearly, a need exists to be able to accomplish all of the above objectives. Preferably, these objectives should be able to be carried out without the necessity of adding supercritical fluid in an amount which is greater than that originally utilized, such that the expected diluent effect of the supercritical fluids can be expected to remain substantially about the same. Of course, if desired, more than the original amount of supercritical fluid may be used, if such amount does not cause the excessive breakup of the composition into two phases.

Accordingly, the present invention provides a means by which the above noted goals may indeed be achieved and, more particularly, provides precursor coating compositions in which those goals have been manifested.

Moreover, a need also exists to provide precursor coating compositions which in addition to achieving the above objectives are also formulated to:

(a) be particularly compatible for subsequent admixture with a supercritical fluid diluent;

(b) be particularly suitable, once admixed with the supercritical fluid, to help minimize any of the phenomena that may occur which are peculiarly associated with the utilization of such supercritical fluid, which phenomena may interfere with proper atomization of the admixed liquid mixture and/or proper diffusion of the supercritical fluid once atomized; and (c) provide the necessary coating characteristics such that once sprayed onto a substrate, it will help provide the necessary coalescence of the deposited droplets to form a coherent liquid coating while still not causing sagging or runs and help minimize any of the other defects noted above while at the same time, still allow for the release of any residual supercritical fluid that may be present after the coating has been applied to the substrate.

Accordingly, the present invention provides such precursor coating compositions which not only fulfill the goals of (1) having an even lower viscosity and/or (2) having even less organic solvent, but which are also particularly suitable for subsequent admixture with at least one supercritical fluid which admixture is then sprayed through an orifice, such as airless spray or air-assisted airless spray methods, to apply an admixed coating composition onto a substrate which results in a substrate having a substantially uniform, continuous and substantially defect-free coating.

SUMMARY OF THE INVENTION

In the more broader aspects of the present invention, it has unexpectedly been found that water may actually be added to an organic solvent-borne coating composition such that when admixed with supercritical fluids, the water acts as an additional viscosity reduction diluent providing a composition having an even lower viscosity. Most importantly, however, the amount of supercritical fluids that are miscible with this water-containing coating composition remains at least substantially the same as in the composition in which no water is present.

This discovery is quite surprising in that it has been found that materials such as liquid carbon dioxide or supercritical carbon dioxide are only sparingly miscible with water or water-borne polymer mixtures. Yet, when in the presence of at least one organic coupling solvent, quite surprisingly, a relatively large amount of water may be added to the organic solvent-borne coating composition under supercritical conditions while still retaining the supercritical fluid miscibility characteristics of the original composition. In general, up to about 30 percent by weight of water, based on the total weight of solvent/diluent present in the composition, may be added with substantially no reduction in the amount of supercritical fluid contained in the composition.

Accordingly, in the illustration noted earlier in which not enough supercritical fluid could be added to a viscous coating composition so as to reduce its viscosity to a point suitable for spraying, this problem can now be solved by simply adding enough water to the composition (up to about 30 percent by weight of the total solvent/diluent present), so as to reduce the initial viscosity of the composition, while still keeping the amount of supercritical fluid that is capable of being admixed with the composition the same. In other words, the addition of the water to the composition serves to act as a further diluent to reduce the viscosity of the composition but does not substantially reduce the miscibility of the now water-containing composition with the supercritical fluids. Most importantly, such a viscosity reduction is achieved without adding organic solvent over and above that which was originally present. While a coupling solvent is desirably added to the composition in conjunction with such water addition, as will be more fully discussed hereinbelow, such coupling solvent may be used to replace some or all of the organic solvent present in the original composition such that the total amount of organic solvent in the water-containing composition is less than or equal to the amount contained in the original composition. With such a viscosity reduction in the new water-containing composition, the amount of supercritical fluids that can be admixed with this composition is generally enough to reduce the viscosity further to a point suitable for spraying.

Similarly, in the illustration noted above in which it would be desirable to replace a low molecular weight polymer with a similar polymer having a higher molecular weight, but the amount of supercritical fluids that can be added to the new formulation cannot be increased to compensate for the increase in viscosity, that too can now be accomplished by adding water to the system. The water acts as a further diluent, and in conjunction with the supercritical fluids (the total amount of which remains substantially the same in both the original composition and in the composition containing water), the viscosity of the reformulated composition containing the higher molecular weight polymer is now reduced to the point that the amount of supercritical fluids that can be admixed with the composition is now enough to reduce the viscosity to a point at which it can be sprayed.

Most significantly, in contrast to the above two illustrations in which water is typically added to a composition so as to actually increase the overall amount of solvent/diluent that is present, the present invention has also recognized that water may also be used to actually replace some of the organic solvent in the original composition. In this manner, while keeping the overall amount of solvent/diluent in the composition substantially about the same, it is possible to reduce even further the amount of volatile organic or non-aqueous solvent that is present in the coating composition so as to accommodate, if needed, the ever increasingly stringent guidelines that are being imposed.

Of course, the present invention recognizes that it is not necessary to start with one composition formulation and then modify it by the addition of water. The present invention clearly encompasses the formulation of an initial composition which is formulated with water in accordance with the present invention.

Still further, the present invention is also directed to coating compositions which are intended for admixture with at least one supercritical fluid and then subsequently sprayed onto a substrate as a liquid coating, particularly coating compositions containing water and organic solvent in accordance with the present invention, and formulated so as to provide such coating compositions with physical and/or chemical characteristics which make them eminently suitable for such intended use.

In particular, by optimizing one or more specific physical and/or chemical properties of the coating composition, a number of factors influencing and affecting the overall coating process, which includes the utilization of a supercritical fluid, are significantly improved. Such factors include, but are not limited to, for example, (1) the ease with which the supercritical fluid is admixed with such compositions; (2) the amount of supercritical fluid that is capable of being admixed with the composition while still desirably maintaining a single phase; (3) the ease with which the resulting liquid admixture is sprayed; (4) the quality of the atomized spray droplets that are produced; (5) the ability of the supercritical fluid to rapidly diffuse from the atomized sprayed droplets; (6) the ability of the atomized liquid droplets to be deposited efficiently onto the substrate; (7) the ability of the atomized liquid droplets, once applied to the substrate, to sufficiently coalesce and form a coherent liquid coating; (8) the ability for any residual supercritical fluid still remaining in the coating applied to the substrate to effectively diffuse and escape; (9) the ability to help form an essentially defect free coating; and the like, all of which are affected, at least in part, by the characteristics of the precursor coating composition.

It is recognized that variables other then the coating composition per se may have an effect on some or all of the above noted factors. For example, the spray temperature, the spray pressure, the particular supercritical fluid being used, the amount of supercritical fluid admixed with the precursor coating composition, the temperature and pressure of the environment in which the substrate is present, the distance between the spray orifice and the substrate, and the like, all have an effect upon the spraying process and the coating results that are obtained. Generally, however, assuming that all of such process variables are kept constant, the formulation of the precursor coating composition will still play a significant role in the overall spraying process and the resulting coating that is obtained.

In particular, the invention comprises a precursor coating composition comprising a liquid mixture of:

(a) a solids fraction containing at least one polymeric compound capable of forming a coating on a substrate; and (b) a solvent fraction containing at least one coupling solvent in which said at least one polymeric compound is at least partially soluble and which is at least partially miscible with water; and (c) water, which is present in an amount of less than about 30% by weight based on the weight of the solvent fraction;

said liquid mixture having:

(i) a viscosity of less than about 6,000 centipoise and having less than about 650 grams of the solvent fraction per liter of mixture;

(ii) a solubility with at least one supercritical fluid, above the critical temperature and pressure of the supercritical fluid, of greater than 5% by weight of supercritical fluid in said mixture;

(iii) a viscosity of less than about 300 centipoise when admixed with a sufficient amount of the at least one supercritical fluid, above the critical temperature and pressure of the supercritical fluid, so as to render the mixture suitable for spray application; and (iv) a solubility with the supercritical fluid in the non-supercritical state, at 25° C. and one atmosphere absolute pressure of said fluid, of less than about 0.8% by weight of fluid in said mixture.

As used herein, the "critical temperature" is defined as the temperature above which a gas cannot be liquefied by an increase in pressure. Also, as used herein, the "critical pressure" is defined as that pressure which is just sufficient to cause the appearance of two phases at the critical temperature.

The invention is also directed to precursor coating compositions as described above to which pigments, pigment extenders, metallic flakes, fillers, drying agents, anti-foaming agents, anti-skinning agents, wetting agents, ultraviolet absorbers, cross-linking agents, and other coating additives are admixed with (a) and (b).

The present invention is also directed to processes for the liquid spray application of the coatings discussed above to a substrate wherein the use of environmentally undesirable volatile organic solvents and non-aqueous diluents may even further be diminished than that realized in the above noted related applications. Accordingly, the process of the present invention comprises:

(a) forming a liquid mixture in a closed system, said liquid mixture comprising:

(i) a solids fraction containing at least one polymeric compound capable of forming a coating on a substrate;

(ii) a solvent fraction containing at least one coupling solvent in which said at least one polymeric compound is at least partially soluble and which is at least partially miscible with water;

(iii) water, which is present in an amount of less than about 30% by weight based on the weight of the solvent fraction; and (iv) at least one supercritical fluid, in at least an amount which when added to (i), (ii), and (iii) is sufficient to render the viscosity of said mixture to a point suitable for spray application; and (b) spraying said liquid mixture onto a substrate to form a liquid coating thereon.

As used herein, the terms "liquid spray", "liquid droplets" or "liquid coating" is meant to define a spray, droplet, or coating containing a portion of the solids fraction, a portion of the solvent fraction, a portion of the water, in addition to any entrained supercritical fluid that may still be present in such spray, droplet or coating.

In both the precursor coating composition as well as in the process using such precursor composition to apply the same to a substrate, in addition to the water, what is generally also desirable is the use of a coupling solvent. Such coupling solvent enables the presence of a single phase in the water-containing composition such that the components of the composition, namely, the polymeric components, the water, and the organic solvent all are at least partially miscible with one another. If desired, all of the organic solvent in the composition may be a coupling solvent. At the very least, the precursor composition contains polymeric component, water and such coupling solvent. The presence of an active solvent which, as used herein, is an organic solvent in which said polymeric compound is at least partially soluble and which is also at least partially miscible with the supercritical fluid, while desirable, is nevertheless optional. Such active solvent would be used in conjunction with a coupling solvent or, may actually be one and the same.

As used herein, it is understood that the phrase "precursor coating composition" is a composition which is primarily intended and particularly suitable for admixture with at least one supercritical fluid for subsequent liquid spraying onto a substrate to provide a liquid coating thereon which, when dried or cured, helps produce a substantially uniform, continuous, substantially defect-free coating. However, if desired, this precursor coating composition may, of course, be utilized for an entirely different purpose although such use would not constitute the preferred objective of the present invention. Thus, the precursor coating composition may be utilized, if desired, by simply adding a suitable solvent to the composition (other than a supercritical fluid) and then using such a diluted composition as a coating medium in any conventional manner. It is to be understood that the scope of the present invention is not narrowly limited to using the precursor coating composition only with supercritical fluid and then spraying the resulting admixture. The precursor coating composition of the present invention is believed to be unique regardless of the manner in which it is eventually used.

Also as used herein, it is understood that the phrases "admixed coating composition" or "admixed liquid mixture" are intended to mean a sprayable mixture of the precursor coating composition and at least one supercritical fluid.

It should be noted and stressed that the above noted instances in which it would be desirable to utilize water as an additional viscosity reducing diluent are only exemplary. Other situations may arise, when using supercritical fluids as a viscosity reduction diluent, in which the use of water as yet an additional diluent would be applicable. Of course, the scope of the present invention includes such additional applications as well.

DETAILED DESCRIPTION OF THE INVENTION

Figure 1:
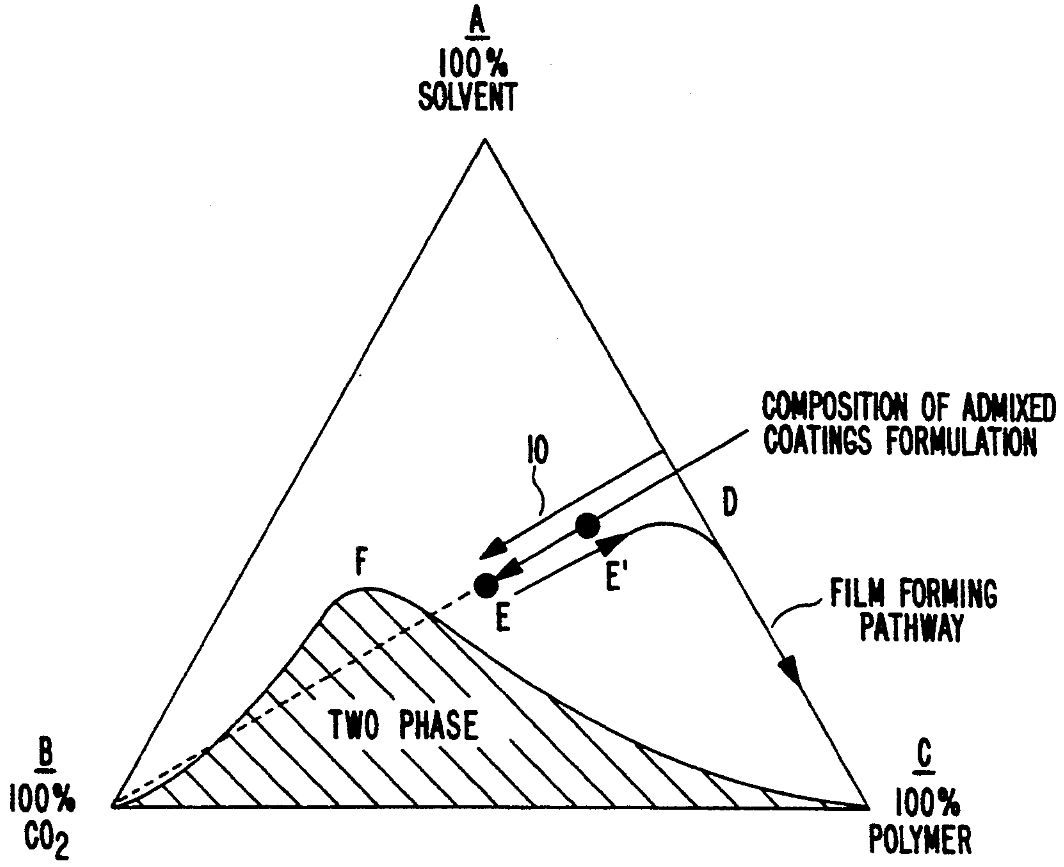
FIG. 1 is a phase diagram of supercritical carbon dioxide fluid spray coating.

Because of its importance to the claimed invention, a brief discussion of relevant supercritical fluid phenomena is warranted.

The supercritical fluid phenomenon is well documented, see pages F-62–F-64 of the CRC Handbook of Chemistry and Physics, 67th Edition, 1986–1987, published by the CRC Press, Inc., Boca Raton, Fla. At high pressures above the critical point, the resulting supercritical fluid, or "dense gas", will attain densities approaching those of a liquid and will assume some of the properties of a liquid. These properties are dependent upon the fluid composition, temperature, and pressure. As used herein, the "critical point" is the transition point at which the liquid and gaseous states of a substance merge with each other and represent the combination of the critical temperature and critical pressure for a given substance.

The compressibility of supercritical fluids is great just above the critical temperature where small changes in pressure result in large changes in the density of the supercritical fluid. The "liquid-like" behavior of a supercritical fluid at higher pressures results in greatly enhanced solubilizing capabilities compared to those of the "subcritical" compound, with higher diffusion coefficients and an extended useful temperature range compared to liquids. Compounds of high molecular weight can often be dissolved in the supercritical fluid at relatively low temperatures. An interesting phenomenon associated with supercritical fluids is the occurrence of a "threshold pressure" for solubility of a high molecular weight solute. As the pressure is increased, the solubility of the solute will often increase by many orders of magnitude with only a small pressure increase. The solvent capabilities of the supercritical fluid, however, are not essential to the broad aspects of the invention.

Near-supercritical liquids also demonstrate solubility characteristics and other pertinent properties similar to those of supercritical fluids. The solute may be a liquid at the supercritical temperatures, even though it is a solid at lower temperatures. In addition, it has been demonstrated that fluid "modifiers" can often alter supercritical fluid properties significantly, even in relatively low concentrations, greatly increasing solubility for some solutes. These variations are considered to be within the concept of a supercritical fluid as used in the context of this invention. Therefore, as used herein, the phrase "supercritical fluid" denotes a compound above, at, or slightly below the critical temperature and pressure (the critical point) of that compound.

Examples of compounds which are known to have utility as supercritical fluids are given in Table 1.

TABLE 1

EXAMPLES OF SUPERCRITICAL SOLVENTS

| Compound | Boiling Point (°C.) | Critical Temperature (°C.) | Critical Pressure (atm) | Critical Density (g/cm³) |
|---|---|---|---|---|
| $CO_2$ | −78.5 | 31.3 | 72.9 | 0.448 |
| $NH_3$ | −33.35 | 132.4 | 112.5 | 0.235 |
| $H_2O$ | 100.00 | 374.15 | 218.3 | 0.315 |
| $N_2O$ | −88.56 | 36.5 | 71.7 | 0.45 |
| Xenon | −108.3 | 16.6 | 57.6 | 0.118 |
| Krypton | −153.2 | −63.8 | 54.3 | 0.091 |
| Methane | −164.00 | −82.1 | 45.8 | 0.2 |
| Ethane | −88.63 | 32.28 | 48.1 | 0.203 |
| Ethylene | −103.7 | 9.21 | 49.7 | 0.218 |
| Propane | −42.1 | 96.67 | 41.9 | 0.217 |
| Pentane | 36.1 | 196.6 | 33.3 | 0.232 |
| Methanol | 64.7 | 240.5 | 78.9 | 0.272 |
| Ethanol | 78.5 | 243.0 | 63.0 | 0.276 |
| Isopropanol | 82.5 | 235.3 | 47.0 | 0.273 |
| Isobutanol | 108.0 | 275.0 | 42.4 | 0.272 |
| Chlorotri-fluoromethane | −31.2 | 28.0 | 38.7 | 0.579 |
| Monofluoro-methane | −78.4 | 44.6 | 58.0 | 0.3 |
| Cyclohexanol | 155.65 | 356.0 | 38.0 | 0.273 |

Due to the low cost, environmental acceptability, non-flammability, and low critical temperature of carbon dioxide, supercritical carbon dioxide fluid is preferably used with the precursor coating compositions of the present invention. For many of the same reasons, nitrous oxide ($N_2O$) is a desirable supercritical fluid for admixture with the precursor coating compositions of the present invention. However, any of the aforementioned supercritical fluids and mixtures thereof are to be considered as being applicable for use with the precursor coating compositions.

The solvency of supercritical carbon dioxide is substantially similar to that of a lower aliphatic hydrocarbon and, as a result, one can consider supercritical carbon dioxide as a replacement for the hydrocarbon solvent of a conventional coating formulation. In addition to the environmental benefit of replacing hydrocarbon solvents with supercritical carbon dioxide, there is a safety benefit also, because carbon dioxide is non-flammable.

To better understand the phenomenon that is occurring when a supercritical fluid, such as supercritical carbon dioxide, is added to a precursor coating composition and the problems that may be encountered, reference is made to the phase diagram in FIG. 1 wherein the supercritical fluid is supercritical carbon dioxide fluid. In FIG. 1, the vertices of the triangular diagram represent the pure components of an admixed coating composition which for the purpose of this discussion contains no water. Vertex A is an organic solvent, vertex B is carbon dioxide, and vertex C represents a polymeric material. The curved line BFC represents the phase boundary between one phase and two phases. The point D represents a possible composition of a coating composition in which supercritical carbon dioxide has not been added. The point E represents a possible composition of an admixed coating composition, after admixture with supercritical carbon dioxide. Generally, the addition of supercritical carbon dioxide reduces the viscosity of the viscous precursor coating composition to a range where it can be readily atomized through a liquid spray apparatus.

Thus, after atomization, a majority of the carbon dioxide vaporizes, leaving substantially the composition of the original viscous coating composition. Upon contacting the substrate, the remaining liquid mixture of the polymer and solvent(s) component(s) will flow, i.e., coalesce, to produce a uniform, smooth film on the substrate. The film forming pathway is illustrated in FIG. 1 by the line segments EE'D (atomization and decompression) and DC (coalescence and film formation).

However, the addition of supercritical carbon dioxide to a viscous coating composition does not always result in a viscosity reduction which is sufficient to allow for spraying of the composition. Such viscosity reduction is limited to the amount of supercritical fluid, such as supercritical carbon dioxide, that can be admixed with the coating composition. If not enough supercritical fluid can be added, then the viscosity of the composition is not lowered enough to make it suitable for spray application. This limitation as to the amount of supercritical fluid that can be added to the composition is generally a function of the miscibility of the supercritical fluid with the coating composition and can best be visualized by again referring to FIG. 1.

As can be seen from the phase diagram, particularly as shown by arrow 10, as more and more supercritical carbon dioxide is added to the coating composition in an attempt to reduce its viscosity sufficiently, the composition of the admixed liquid coating mixture approaches the two-phase boundary represented by line BFC. If enough supercritical carbon dioxide is added, the two-phase region is reached and the composition correspondingly breaks down into two phases. Sometimes, it may be desirable to admix an amount of supercritical fluid (in this case, supercritical carbon dioxide) which is even beyond the two phase boundary. Generally, however, it is not preferable to go much beyond this two phase boundary for optimum spraying performance and/or coating formation. This two-phase region may be reached, however, prior to achieving the necessary viscosity reduction. Any additional supercritical carbon dioxide added to the system beyond this point will generally not aid in any further viscosity reduction.

Figure 2:
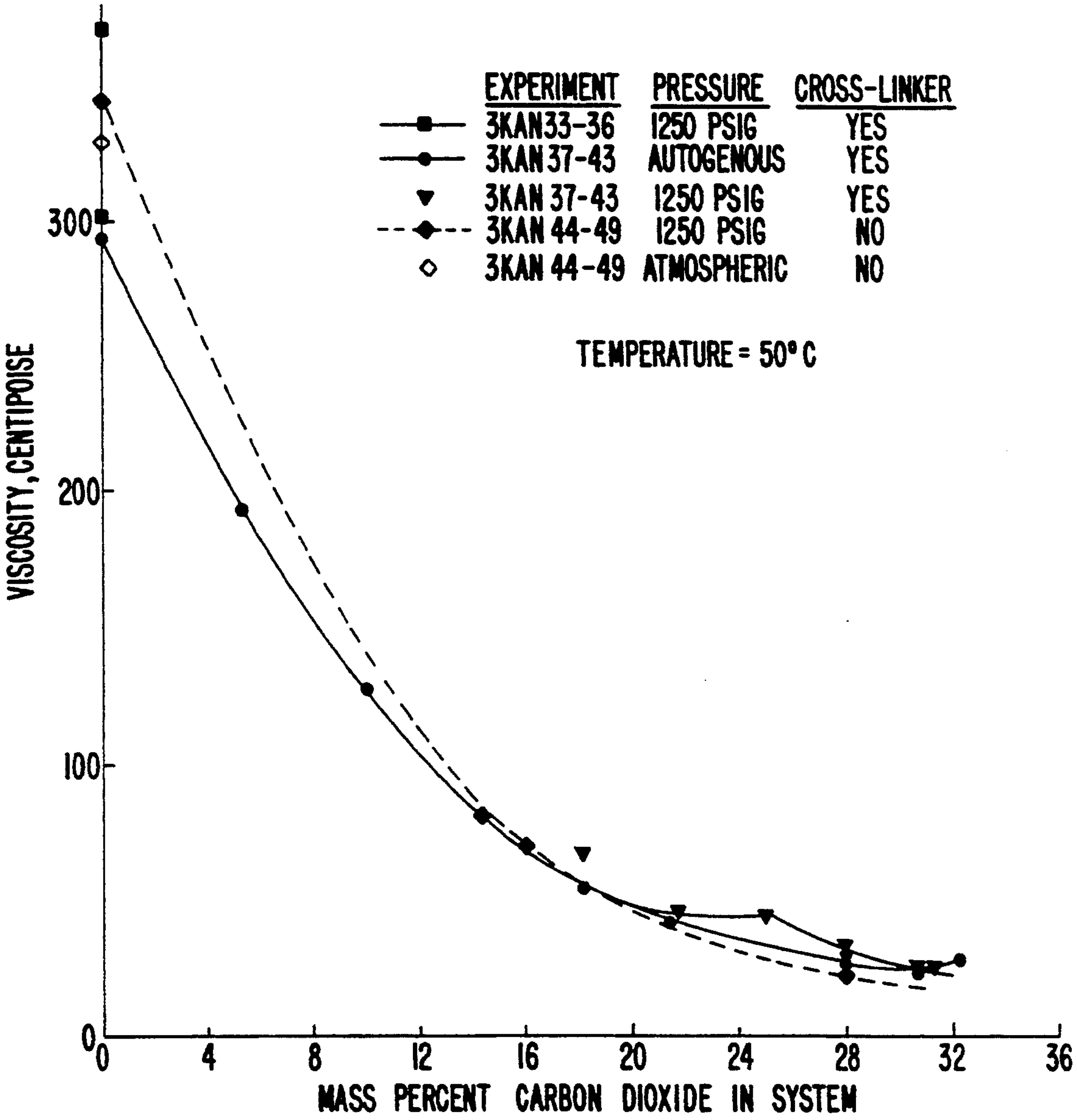
FIG. 2 is a graph illustrating the viscosity versus composition relationship for a 65% viscous polymer solution in methyl amyl ketone.

Viscosity reduction brought about by adding supercritical carbon dioxide fluid to viscous coatings composition is illustrated in FIG. 2. There, the viscous coating composition of 65 percent polymer solution in methyl amyl ketone, which corresponds to point D in FIG. 1 has a viscosity of about 300 centipoise and the solution is unsprayable. Adding supercritical carbon dioxide fluid to the coating composition reduces the viscosity such that a liquid mixture that contains 28 percent supercritical carbon dioxide fluid, which corresponds to point E in FIG. 1, is formed. This liquid mixture now has a viscosity of less than 30 centipoise and readily forms a liquid spray by passing it through an orifice in an airless spray gun. The pressure utilized in FIG. 2 is 1250 psi at a temperature of 50° C. The polymer is Acryloid TM AT-400, a product of Rohm and Haas, which contains 75 percent of non-volatile acrylic polymer dissolved in 25 percent methyl amyl ketone.

In accordance with the present invention, however, water may be added to a highly viscous coating composition as a further viscosity reducing diluent, which water-containing composition may then be admixed with supercritical fluids. Regardless of how the coating composition has come to have an unusually high viscosity, whether it be due to the nature of the polymer itself (e.g., its molecular weight) or the nature and/or amount of the solvent present in the composition, the addition of the water will generally aid in reducing the viscosity to the extent such that when admixed with the supercritical fluids, the resulting admixed composition containing such water and supercritical fluids will be suitable for spraying.

Generally, the amount of water that is present in the composition is up to about 30 percent by weight based on the weight of the total solvent fraction contained in the composition. Preferably, the amount of water is less than about 20 percent by weight on that same basis.

Higher quantities of water than those noted above may be not be desirable for a number of reasons. For one, too much water may also result in a phase separation, i.e., the composition breaks down into a water phase and an organic solvent phase. Such a phase separation, as in the case of a phase separation caused by an excessive amount of supercritical fluid, may result in poor spraying performance and/or poor coating formation.

Thus, without wishing to be bound by theory, once such a phase separation takes place, the separate water phase may attract supercritical fluid and organic solvent leaving less organic solvent present in the separate organic solvent phase. This may result in a viscosity imbalance between the two phases which may very well hinder or prevent the spray application of the coating composition.

So too, it is also believed, again without wishing to be bound by theory, that the concentration of the organic solvent in the water phase may be such that even if the composition were sprayed, there may be an excessive evaporation of such solvent resulting in an insuffícent amount of solvent on the substrate to allow for proper coalescence of the atomized particles resulting in a poor coating.

For similar reasons, in the case where water is added to a coating composition so as to replace a portion of the organic solvent present therein and thereby further reduce the overall organic solvent content, there should still be enough solvent present which will facilitate the proper flow-out and coalescence of the sprayed particles on the substrate to form a desirable coating thereon.

Accordingly, it is generally desirable to add as much water as may be necessary so as to provide a precursor coating composition whose viscosity may be reduced to a point suitable for spray application by subsequent admixture with supercritical fluids.

Although the above discussion has focused upon those cases in which the amount of supercritical fluid added to a viscous composition is ineffective to reduce the viscosity to the extent necessary in order to spray such composition and adding water to these compositions in accordance with the present invention so as to be able to spray them, it is understood that the addition of water to a coating composition is not limited to only those conditions. Indeed, water may be added to a coating composition for subsequent admixture with supercritical fluids even when the viscosity of the original composition is such that the addition of supercritical fluids is indeed capable of reducing the viscosity to a point suitable for spraying.

For example, in the case where it is desirable to simply reduce the amount of volatile organic solvent present in a first coating composition where such first coating composition could be sprayed when admixed with supercritical fluids, it is clear that when water is used to replace some of the volatile solvent contained therein, there is no concern here as to phase separation caused by an excessive amount of supercritical fluid.

As briefly discussed earlier, even after water is added to a coating composition, it has been found by virtue of the present invention that the amount of supercritical fluid that is capable of being admixed with the now water-containing composition, in absolute terms, remains substantially the same. In other words, if, for example, 100 grams of supercritical carbon dioxide were able to be admixed with a particular composition, after adding water to this composition, approximately 100 grams of supercritical carbon dioxide can still be admixed with the now water-containing composition.

That is not to say, however, that it is necessary to add the same amount of carbon dioxide in the new water-containing composition as was capable of being added to the original composition. Although it is beneficial to maximize the amount of supercritical fluids that are utilized as diluents for viscosity reduction to thereby keep the solvent fraction, particularly the organic solvents and/or non-aqueous diluents to a minimum, there is no criticality as to the amount of supercritical fluids that are used other than using an amount which will produce a sprayable composition.

However, the capability of the water-containing composition to be admixed with the same amount of supercritical fluids that was able to be used in the "dry" composition is significant inasmuch as the concomitant diluent effect that is obtained by the supercritical fluid can be expected to also remain substantially constant.

In addition to the water that is present in the precursor coating compositions of the present invention, which water is used as a further viscosity reducing diluent, it is generally also desirable to have a coupling solvent present in the precursor coating composition as well. Of course, if a coating composition to which the water is added already contains an organic solvent which may be characterized as a coupling solvent, no further addition of such a coupling solvent need be made. Similarly, if a precursor composition is being initially prepared with water, at least one of the organic solvents used for such composition should desirably be a coupling solvent.

A coupling solvent is a solvent in which the polymeric compounds used in the solids fraction is at least partially soluble. Most importantly, however, such a coupling solvent is also at least partially miscible with water. Thus, the coupling solvent enables the miscibility of the solids fraction, the solvent fraction and the water to the extent that a single phase is desirably maintained such that the composition may optimally be sprayed and a good coating formed.

Coupling solvents are well known to those skilled in the art and any conventional coupling solvents which are able to meet the aforementioned characteristics, namely, those in which the polymeric components of the solid fraction is at least partially soluble and in which water is at least partially miscible are all suitable for being used in the present invention.

Applicable coupling solvents which may be used in the present invention include, but are not limited to, ethylene glycol ethers, propylene glycol ethers, chemical and physical combinations thereof; lactams; cyclic ureas; and the like.

Specific coupling solvents (which are listed in order of most effectiveness to least effectiveness) include butoxy ethanol, propoxy ethanol, hexoxy ethanol, isopropoxy 2-propanol, butoxy 2-propanol, propoxy 2-propanol, tertiary butoxy 2-propanol, ethoxy ethanol, butoxy ethoxy ethanol, propoxy ethoxy ethanol, hexoxy ethoxy ethanol, methoxy ethanol, methoxy 2-propanol, and ethoxy ethoxy ethanol. Also included are lactams such as n-methyl-2-pyrrolidone, and cyclic ureas such as dimethyl ethylene urea.

In addition to a coupling solvent, it may also be desirable to add (or have present) an active solvent as well. An active solvent, as used herein, is meant to include those solvents which have particularly good solubility for the polymeric compounds that are used in the composition in addition to having at least partial miscibility with supercritical fluids.

Suitable active solvents which may be utilized in the precursor coating compositions of the present invention include ketones such as acetone, methyl ethyl ketone, methyl isobutyl ketone, mesityl oxide, methyl amyl ketone, cyclohexanone and other aliphatic ketones; esters such as methyl acetate, ethyl acetate, alkyl carboxylic esters; ethers such as methyl t-butyl ether, dibutyl ether, methyl phenyl ether and other aliphatic or alkyl aromatic ethers; glycol ethers such as ethoxy ethanol, butoxy ethanol, ethoxy 2-propanol, propoxy ethanol, butoxy 2-propanol and other glycol ethers; glycol ether esters such as butoxyethoxy acetate, ethyl 3-ethoxy propionate and other glycol ether esters; alcohols such methanol, ethanol, propanol, iso-propanol, butanol, iso-butanol, amyl alcohol and other aliphatic alcohols; aromatic hydrocarbons such as toluene, xylene, and other aromatics or mixtures of aromatic solvents; aliphatic hydrocarbons such as VM&P naphtha and mineral spirits, and other aliphatics or mixtures of aliphatics; nitro alkanes such as 2-nitropropane. A review of the structural relationships important to the choice of solvent or solvent blend is given by Dileep et al., *Ind. Eng. Che.* (Product Research and Development) 24, 162, 1985 and Francis, A. W., *J. Phys. Chem.* 58, 1099, 1954.

Of course, there are solvents which can function both as coupling solvents as well as active solvents and the one solvent may be used to accomplish both purposes. Such solvents include, for example, butoxy ethanol, propoxy ethanol, and propoxy 2-proponal. Glycol ethers are particularly preferred.

When using both a coupling solvent as well as an active solvent in the precursor coating compositions of the present invention, the ratio of coupling solvent to active solvent by weight is generally in the range of from about 1:1 to 4:1, preferably about 2:1 to 3.5:1, and most preferably about 2.5:1 to 3:1. Generally, the ratio of coupling solvent to active solvent will be dependent, among other things, on the hydrophobicity of the active solvent.

The presence of too much coupling solvent may interfere with the dissolution of the polymer while the presence of too much active solvent may interfere with proper miscibility of the water.

While the polymeric compounds that are suitable for use in the present invention as coating materials generally include any of the polymers which are well known to those skilled in the coatings art, there are preferred polymers which are particularly desirable due to their possessing specific characteristics which make them generally more suitable for (1) admixture with supercritical fluids followed by (2) spraying such admixture onto a substrate so as to help obtain a defect free coating.

Generally, the polymers which may be used in the present invention must be able to withstand the temperatures and/or pressures which are involved when they are ultimately admixed with the at least one supercritical fluid. Such applicable polymers include thermoplastic or thermosetting materials or may be crosslinkable film forming systems.

In particular, the polymeric components include vinyl, acrylic, styrenic, and interpolymers of the base vinyl, acrylic, and styrenic monomers; polyesters, oil-free alkyds, alkyds, and the like; polyurethanes, oil-modified polyurethanes and thermoplastic urethanes systems; epoxy systems; phenolic systems; cellulosic esters such as acetate butyrate, acetate propionate, and nitrocellulose; amino resins such as urea formaldehyde, melamine formaldehyde, and other aminoplast polymers and resins materials; natural gums and resins; and enamels, varnishes, and lacquers. Also included are mixtures of the above coating materials commonly used and known to those skilled in the art that are formulated to achieve performance and cost balances required of commercial coatings.

One characteristic which is possessed by particularly preferred polymers that are used in the present invention are those having a low elastic component of viscosity. A discussion of the components of viscosity can be found in, for example, "Rheological Measurement for Quality Control" by S. B. Driscoll, *Rubber World* (December, 1980), pages 31–34, the contents of which are incorporated by reference. Thus, where a number of polymers may provide a precursor coating composition having essentially the same viscosity, the most preferred polymer would be the one having the least elastic component of viscosity. Such polymers having a low elastic component of viscosity are generally those having a structural and molecular weight distribution which, in solution, minimizes chain entanglement. Particularly, the high molecular weight distribution of the polymeric compound should be minimized. A useful and conventional measure for the high molecular weight fraction of the molecular weight distribution is the ratio of the weight average (Mw) molecular weight of the polymeric compound to the number average (Mn) molecular weight of that polymeric compound, i.e., Mw/Mn. Reference is made to, for example, "Introduction to Polymers and Resins", Federation Series On Coatings Technology (1986), pages 26–31, which discusses molecular weight determination of polymers. the contents of which are incorporated herein by reference. Generally, for a given number average molecular weight, Mn, the higher the ratio of Mw/Mn, the greater the high molecular weight fraction that is present in the polymer, and the greater the elastic component of viscosity possessed by such polymer.

Preferably, the predominant polymeric compound used in the precursor composition of the present invention has a Mw/Mn ratio of less than about 4, and preferably less than about 3, and most preferably less than about 2.

The higher the elastic component of viscosity possessed by the polymer, the more elastic a polymer is, the more difficult it is to atomize an admixed precursor coating composition containing supercritical fluid made from such a polymer. Generally, as an admixed coating composition is released through the spray orifice, shearing forces act upon the material causing it to tear itself apart into fine atomized droplets. When, however, the polymer has a high elastic component of viscosity, such tearing apart is hindered and the composition does not atomize as well.

Particularly desirable polymers having a relatively low elastic component of viscosity include those set forth in Table 2 below.

TABLE 2

| Polymer | $M_n$ | $M_w$ | $M_w/M_n$ |
|---|---|---|---|
| Alkyd resins | 25,000–50,000 | 50,000–200,000 | 2–4 |
| Epoxy resins | 350–4,000 | 350–7,000 | 1.0–2.5 |
| Acrylic, thermoplastic, solution polymer | 25,000–350,000 | 40,000–600,000 | 1.5–3 |
| Acrylic, thermoplastic, emulsion polymer | 500,000–2,000,000 | 650,000–2,500,000 | 1.1–1.8 |
| Acrylic thermosetting, oligomer | 1,000–2,000 | 1,200–2,200 | 1.1–1.5 |
| Polybutadiene, anionic polymerized | 2,000–5,000 | 2,100–5,200 | 1.05–1.1 |

In addition to the polymeric compound that is contained in the solids fraction, additives which are typically utilized in coatings may also be used. For example, pigments, pigment extenders, metallic flakes, fillers, drying agents, anti-foaming agents, and anti-skinning agents, wetting agents, ultraviolet absorbers, cross-linking agents, and mixtures thereof, may all be utilized in the precursor composition of the present invention.

In connection with the use of the various additives noted above, it is particularly desirable for pigments to be present in the precursor composition inasmuch as it has been found to aid in the diffusion of the supercritical fluid from the sprayed composition resulting in improved atomization.

The solvent fraction of the precursor composition of the present invention includes at least one coupling solvent in which the at least one polymer compound is at least partially soluble and which is at least partially miscible with water, as discussed earlier. Optionally, an active solvent, as noted above, may also be employed. While the solvents that are suitable for use in the present invention generally include (as long as there is a coupling type solvent present) any solvent or mixtures of solvent which is capable of dissolving, dispersing or suspending the solids fraction when admixed with the supercritical fluid, as with the solids fraction discussed above, there are preferred solvents and solvent mixtures which are particularly desirable. Such preferred solvents, either coupling and/or active, possess certain desirable characteristics which make them generally more suitable for admixture with a supercritical fluid followed by spraying such admixture onto a substrate material.

As is quite apparent, the selection of a particular solvent or solvent mixture will generally be dependent upon the particular polymeric compounds being used.

In general, solvents suitable for the present invention should have the desired solvency characteristics as aforementioned and also the proper balance of evaporation rates so as to ensure coating formation. In other words, the solvent fraction should have a proper blend of fast and slow solvents.

More specifically, solvents having fast evaporation rates are needed to help solubilize the solids fraction, as well as help reduce viscosity, and to substantially leave the admixed coating composition once it has been sprayed and before the atomized droplets contact the substrate. Correspondingly, solvents having slow evaporation rates are also needed to help solubilize the solids fraction, but these solvents are primarily needed to be present on the substrate after the atomized droplets have been applied so as to provide a suitably low viscosity to produce enough flow-out to obtain a uniform and continuous coating.

However, too much of the fast solvent will produce a dry coating not having enough flow-out. Conversely, too much of the slow solvent will produce a coating having sagging and running defects and will not readily be dried thereby hindering the early handling of such a coated substrate.

Based on a relative evaporation rate (RER) to a butyl acetate standard equal to 100 using ASTM Method D3599 at 25° C. and one atmosphere pressure, the solvent fraction desirably has the following composition of fast and slow solvents as represented by corresponding RER values:

| Wt. % of Total Solvent Fraction | RER |
|---|---|
| 30–100% | <50 |
| 0–70% | 50–100 |
| 0–40% | 101–250 |
| <10% | >250 |

More preferably, the solvent fraction has the following composition:

| Wt. % of Total Solvent Fraction | RER |
|---|---|
| 40–100% | <50 |
| 0–60% | 50–100 |
| 0–30% | 101–250 |
| <5% | >250 |

Another characteristic of the solvent fraction which desirably is optimized so as to make it particularly suitable for admixture with a supercritical fluid with subsequent spraying thereof is the surface tension of the solvent fraction. Specifically, the less surface tension that a solvent has, the more desirable it is.

Accordingly, solvents having low surface tension provide good atomization of the admixed precursor coating composition providing a fine aerosol. Such a fine aerosol desirably facilitates the escape of the supercritical fluid from the sprayed admixed coating composition prior to its contacting the substrate.

Moreover, solvents having low surface tension also facilitate the formation of good coatings on the substrate by aiding in the diffusion of any residual supercritical fluid that may still be entrapped within the applied coating. So too, low surface tension solvents also help to suppress the formation of any bubbles caused by such residual supercritical fluid as it escapes. Still further, solvents having low surface tension desirably provide fast wetting and spreading characteristics which also aid in the formation of a defect-free, uniform coating on the substrate.

Preferably, the solvent fraction has a surface tension at 25° C. which is desirably less than 35 dynes/centimeter. More preferably, the surface tension is less than 30 dynes/centimeter, for example, 23–28 dynes/centimeter.

It is understood that it is not necessary that the solvent or solvent mixture possess such surface tension characteristics per se. While such solvents do certainly exist, as exemplified by such solvents as toluene, VM&P naphtha, butyl acetate, pentyl propionate, glycol ethers, methyl PROPASOL® acetate (manufactured by Union Carbide Corp., Danbury, Conn.), UCAR® Ester EEP (manufactured by Union Carbide Corp., Danbury, Conn.), and the like, there are conventional additives which may be added to the precursor composition which contains the solvent and solids fractions so as to suppress the surface tension of the composition as a whole. Such additives include surface active materials, commonly known as surfactants, which are well known to those skilled in the art and which are applicable to be used in both the solvent fraction of the present invention as well as in the precursor coating composition as a whole.

Still further in connection with the solvent fraction, as the admixed coating composition containing the mixture of polymer, solvent, water and supercritical fluid is sprayed, the vaporization of the fast solvent contributes to the overall cooling of the sprayed composition. Inasmuch as the solubility of most supercritical fluids, particularly carbon dioxide, is higher at cooler temperatures, such cooling manifestly hinders the diffusion of the supercritical fluid from the sprayed composition. It is desirable to have essentially all of the supercritical fluid escape from the admixed coating composition, once it has been sprayed, such that essentially none of the supercritical fluid is left once the atomized liquid droplets contact the substrate.

In order to help minimize the cooling effect caused by evaporation of the fast solvent, it is desirable that the solvent fraction have an overall low heat of vaporization. Preferably, the solvent fraction has an overall heat of vaporization of less than 110 calories per gram of solvent fraction and more preferably, less than about 100 calories per gram of solvent fraction. Desirably, the overall heat of vaporization of the solvent fraction is in the range of from about 65 to 95 calories/gram.

Keeping in mind the underlying primary objective of the present invention, namely, to minimize the unnecessary release of solvent vapors into the atmosphere during the spray application of the admixed coating compositions, it is clear that the amount of solvent used in the precursor coating compositions should be less than that required to produce a mixture of polymeric compounds and solvent having a viscosity which would permit its application by liquid spray techniques. In other words, the inclusion of the solvent fraction should be minimized such that the diluent effect due to the presence of the supercritical fluid diluent is fully utilized.

However, reducing the amount of solvent in the coating composition is beneficial not only for the purpose of minimizing environmental pollution, but as recognized by the present invention, such reduction in the amount of solvent is also desirable to help facilitate the spraying of the coating composition once it has been admixed with supercritical fluid as well as improving the appearance of the coating that is ultimately formed on the substrate.

More specifically, as the amount of solvent fraction present in the precursor coating composition is increased and after such composition has been admixed with supercritical fluid and sprayed, the rate of diffusivity of such supercritical fluid through the sprayed composition generally decreases. This typically results in an increase of residual supercritical fluid retained in the coating after it has been applied to the substrate which may result in the formation of coating defects. In order to compensate for such decreased diffusivity, the temperature of the sprayed composition is generally raised so as to lower the solubility of the supercritical fluid. However, such an increase in spray temperature may have an effect on the particle size and the atomization quality of the sprayed composition.

Still further, as the solvent fraction in the precursor coating composition is increased, there is a corresponding loss in the distinctness of image gloss (DOI) in the resulting coating. This is believed to be caused by a concomitant increase in the amount of residual supercritical fluid that is retained in the applied coating which gradually fizzles out of the coating.

Furthermore, an excessive solvent fraction in the precursor coating composition diminishes the effectiveness of the supercritical fluid, because atomization is intensified such that deposition of the liquid spray onto the substrate becomes poorer than when the solvent fraction is not excessive. That is, the transfer of liquid coating to the substrate becomes less efficient. Therefore, more spraying must be done to build up coating thickness, with the result that more solvent is released to the environment and more precursor coating composition is used, which increases cost. In addition, because more spray passes must be used to build the desired coating thickness, a higher proportion of slow solvent is lost from the coating during the application process, so that less slow solvent is available to aid reflow of the coating to give a smooth surface once the desired coating thickness has been achieved. Without wishing to be bound by theory, it is believed that viscosity reduction caused by the excessive solvent fraction combines with viscosity reduction caused by the supercritical fluid to give droplets that have insufficient mass to be deposited efficiently onto the substrate from the spray. Instead, the droplets follow the gas flow into the environment. Using less solvent allows full utilization of the viscosity reduction of the supercritical fluid and gives droplet sizes that deposit efficiently onto the substrate.

Moreover, an excessive solvent fraction produces a greater wet coating thickness for a desired dry coating thickness and a lower coating viscosity on the substrate, which increases the tendency for the coating to sag or run during application, drying, and curing. In addition, as the excessive solvent evaporates from the coating, the coating shrinks to a greater degree during the drying process and flow currents can be induced inside the coating which disrupt the leveling to give a smooth surface. Drying time is also increased.

Consequently, in accordance with the present invention, the amount of solvent fraction that is present in the liquid mixture comprised of a solids fraction, a solvent fraction and water is no greater than about 650 grams of solvent per liter of liquid mixture. More preferably, the amount of solvent fraction contained in the liquid mixture is less than about 450 grams of solvent per liter of liquid mixture. Most preferably, the amount of solvent fraction is in the range of from about 200 to about 400 grams of solvent per liter of mixture.

The liquid precursor coating composition of the present invention comprising the solids fraction, the solvent fraction and water should have a viscosity of less than about 6,000 centipoise, and preferably less than about 3,000 centipoise, and most preferably in the range of from about 500 to about 2,000 centipoise. Obviously, a major factor contributing to the viscosity of the liquid mixture is the amount of solvent fraction and water contained therein, which variable was discussed above. Hence, it is apparent that the amount of solvent fraction present in the precursor coating composition should be considered hand-in-hand with the desired viscosity that is to be obtained.

The viscosity of the precursor coating composition should be low enough such that there is enough solvent and water present to provide proper coalescence upon the substrate once the composition is sprayed while still being high enough to allow for a reduction in solvent usage so as to maximize the utilization of the supercritical fluid diluent and to concomitantly facilitate good atomization and coating formation.

The viscosity of the precursor coating composition should also be such that when supercritical fluid is added, it is possible to add enough of the supercritical fluid, without entering the two phase region, such that the viscosity is lowered to less than about 300 centipoise, above the critical temperature and pressure of the supercritical fluid, so as to render the mixture suitable for spray application. More preferably, the admixed liquid coating composition has a viscosity which is less than about 150 centipoise and preferably has a viscosity in the range of from about 5 to 150 centipoise. Most preferably, the viscosity of the admixture of solids fraction, solvent fraction, water and supercritical fluid is in the range of from about 10 to about 50 centipoise.

Yet another factor which the precursor coating composition must address is the solubility of the supercritical fluid both at supercritical conditions and at the conditions of the substrate, i.e., after the composition has been sprayed.

The solubility requirements for these two sets of conditions are totally antithetical to one another. Thus, when admixing the supercritical fluid with the liquid precursor composition, it is desirable to have a composition which has a high solubility for the supercritical fluid at the supercritical conditions. In contrast, once the composition has been sprayed through the orifice, it is desirable that the solubility for the supercritical fluid at the conditions present in the environment of the substrate be as low as possible.

More particularly, in accordance with the present invention, the liquid precursor coating composition should have a solubility for the supercritical fluid, above the critical temperature and pressure of the supercritical fluid, of at least 5% by weight of the supercritical fluid in the liquid mixture. Preferably, the solubility should be at least 15% by weight of the supercritical fluid in the mixture and, more preferably about 20 to 50% or greater by weight of supercritical fluid in the mixture. Most preferably, it is in the range of from about 25% to about 35% by weight.

If the precursor coating composition has a solubility which is less than that noted above, there simply would not be enough of a diluent effect provided by the supercritical fluid. This would result in an insufficient viscosity reduction such that the composition could not properly be sprayed.

Once the composition is admixed with supercritical fluid and sprayed, it is desirable to have the supercritical fluid diffuse through the sprayed composition as quickly as possible such that there is very little residual supercritical fluid left in the coating once it has come into contact with the substrate. Accordingly, the fluid, which of course is no longer supercritical, should have a solubility in the liquid precursor coating composition of less than about 0.8% by weight of the fluid in the non-supercritical state in the precursor coating composition. Preferably, the solubility of the fluid is less than about 0.6% by weight in the composition. Most preferably, the fluid should be soluble in the precursor coating composition in an amount of less than about 0.4% by weight. As used herein, it is to be understood that the solubility of the fluid in the non-supercritical state is measured at 25° C. and in one atmosphere absolute pressure of the fluid.

A still further characteristic which the precursor coating composition should desirably possess is a high diffusivity for passing the supercritical fluid out of the composition once it has been sprayed with such supercritical fluid into the environment of the substrate. Such high diffusivities are desirable to help the supercritical fluid quickly escape from the sprayed liquid mixture. This helps prevent the presence of any residual supercritical fluid in the liquid coating applied to the substrate and thereby helps ensure the formation of a uniform, defect-free coating.

Accordingly, the precursor coating composition should desirably possess an apparent gas diffusion rate (based on a sprayed particle average velocity of about 2 to about 8 m/sec and a spraying distance of about 30 cm at 25° C. and one atmosphere pressure) from the time it has been sprayed with supercritical fluid to the time it impacts on the substrate of at least about 7 to about 26 grams of supercritical fluid per gram of presursor coating composition per second.

The precursor coating composition, after having been admixed with supercritical fluid, is sprayed onto a substrate to form a liquid coating thereon containing solids fraction, a portion of the solvent fraction, a portion of the water and any residual supercritical fluid that may be left by passing the admixed liquid mixture under pressure through an orifice into the environment of the substrate to form a liquid spray.

An orifice is a hole or an opening in a wall or housing, such as in a spray tip of a spray nozzle on an electrostatic spray gun, through which the admixed liquid coating composition flows in going from a region of higher pressure, such as inside the spray gun, into a region of lower pressure, such as the air environment, outside of the spray gun and around the substrate. An orifice may also be a hole or an opening in the wall of a pressurized vessel, such as a tank or cylinder. An orifice may also be the open end of a tube or pipe or conduit through which the mixture is discharged. The open end of the tube or pipe or conduit may be constricted or partially blocked to reduce the open area.

Spray orifices, spray tips, spray nozzles, and spray guns used for conventional electrostatic airless and air-assisted airless spraying of coating formulations such as paints, lacquers, enamels, and varnishes, are suitable for spraying the precursor coating compositions of the present invention when admixed with supercritical fluids. Spray guns, nozzles, and tips are preferred that do not have excessive flow volume between the orifice and the valve that turns the spray on and off. The spray guns, nozzles, and tips must be built to contain the spray pressure used.

There are a broad variety of spray devices that one may use in spraying the precursor coating composition of the present invention after it has been admixed with supercritical fluid. Essentially, any spray gun may be used, from conventional airless and air-assisted airless spray devices to electrostatic spray devices. The choice of spray device is dependent upon the kind of application that is contemplated.

The material of construction of the orifice through which the admixed coating composition is sprayed must possess the necessary mechanical strength for the high spray pressure used, have sufficient abrasion resistance to resist wear from fluid flow, and be inert to chemicals with which it comes into contact. Any of the materials used in the construction of airless spray tips, such as boron carbide, titanium carbide, ceramic, stainless steel or brass, is suitable, with tungsten carbide generally being preferred.

The orifice sizes suitable for spraying the admixed liquid mixture should generally range from about 0.004-inch to about 0.072-inch diameter. Because the orifices are generally not circular, the diameters referred to are equivalent to a circular diameter. The proper selection is determined by the orifice size that will supply the desired amount of liquid coating and accomplish proper atomization for the coating. Generally, smaller orifices are desired at lower viscosity and larger orifices are desired at higher viscosity. Smaller orifices give finer atomization but lower output. Larger orifices give higher output but poorer atomization. Finer atomization is preferred in the practice of the present invention. Therefore, small orifice sizes from about 0.004-inch to about 0.025-inch diameter are preferred. Orifice sizes from about 0.007-inch to about 0.015-inch diameter are most preferred.

The designs of the spray tip that contains the spray orifice and of the spray nozzle that contains the spray tip are not critical. The spray tips and spray nozzles should have no protuberances near the orifice that would interfere with the spray.

The shape of the spray is also not critical to being able to spray the admixed coating composition. The spray may be in the shape of a cone that is circular or elliptical in cross section or the spray may be in the shape of a flat fan, but the spray is not limited to these shapes. Sprays that are flat fans or cones that are elliptical in cross section are preferred.

The distance from the orifice to the substrate is generally at a distance of from about 4 inches to about 24 inches. A distance of 6 inches to 18 inches is preferred. A distance of 8 inches to 14 inches is most preferred.

Devices and flow designs that promote turbulent or agitated flow in the liquid mixture prior to passing the liquid mixture under pressure through the orifice may also be used. Such techniques include but are not limited to the use of pre-orifices, diffusers, turbulence plates, restrictors, flow splitters/combiners, flow impingers, screens, baffles, vanes, and other inserts, devices, and flow networks that are used in electrostatic airless spray and air-assisted airless spray.

Filtering the liquid mixture prior to flow through the orifice is desirable in order to remove particulates that might plug the orifice. This can be done using conventional high-pressure paint filters. A filter may also be inserted at or in the gun and a tip screen may be inserted at the spray tip to prevent orifice plugging. The size of the flow passages in the filter should be smaller than the size of the orifice, preferably significantly smaller.

Electrostatic forces may be used to increase the proportion of precursor coating composition that is deposited onto a substrate from the spray. This is commonly referred to as increasing the transfer efficiency. This is done by using a high electrical voltage relative to the substrate to impart an electrical charge to the spray. This creates an electrical force of attraction between the spray droplets and the substrate, which causes droplets that would otherwise miss the substrate to be deposited onto it. When the electrical force causes droplets to be deposited on the edges and backside of the substrate, this effect is commonly referred to as wrap around.

Preferably the substrate is grounded, but it may also be charged to the opposite sign as the spray. The substrate may be charged to the same sign as the spray, but at a lower voltage with respect to ground, but this is of less benefit, because this produces a weaker electrical force of attraction between the spray and the substrate than if the substrate were electrically grounded or charged to the opposite sign. Electrically grounding the substrate is the safest mode of operation. Preferably the spray is charged negative relative to electrical ground.

The method of charging the spray is not critical to the practice of the invention provided the charging method is effective. The precursor coating composition can be electrically charged by applying high electrical voltage relative to the substrate and electrical current (1) within the spray gun, by direct contact with electrified walls or internal electrodes before leaving the orifice; (2) after the spray emerges from the orifice, by electrical discharge from external electrodes located near the orifice and close to the spray; or (3) away from the orifice, by passing the spray through or between electrified grids or arrays of external electrodes before the spray is deposited onto the substrate. Methods (1) and (2), individually or in combination, are preferred. Method (2) is most preferred.

In charging method (1) above, the spray gun must be electrically insulating. The high voltage and electrical current is supplied to the admixed liquid mixture inside the gun by direct contact with an internal surface that is electrically conducting and electrified. This may be part of the wall of the flow conduit inside the gun or internal electrodes that extend into the flow or a combination of electrified elements, including the spray nozzle. The contact area must be large enough to transfer sufficient electrical charge to the admixed liquid mixture as it flows through the gun. This internal charging method has the advantage of having no external electrode that could interfere with the spray. A disadvantage is that if the admixed liquid mixture is not sufficiently electrically insulating, electrical current leakage can occur through the admixed liquid mixture to a grounded feed supply tank or feed delivery system. This reduces the amount of charge going to the spray. If current leakage is too high, then the feed supply tank and feed delivery system must be insulated from electrical ground, that is, be charged to high voltage. Current leakage can be measured by measuring the current flow from the high voltage electrical power supply without fluid flow. The current charging the spray is then the difference between the current with fluid flow and the current without fluid flow. The leakage current should be small compared to the charging current.

In charging method (2) above, the spray is electrically charged after it emerges from the orifice or in the vicinity of the orifice. The spray gun and spray nozzle must be electrically insulating. The electrical charge is supplied from external electrode(s) close to the spray tip and adjacent to the spray. Under high electrical voltage, electrical current is discharged to the spray. The preferred electrodes are one or more metal wire(s) positioned adjacent to the spray. The electrodes may be either parallel to the spray or perpendicular to it or any orientation in between such that the electrical current issuing from the sharp point is favorably directed to the spray. The electrode(s) must be positioned close enough to the spray, preferably within one centimeter, to effectively charge the spray without interfering with the flow of the spray. The electrodes may be sharp pointed and may be branched. For planar sprays, one or more electrodes are preferably located to the side(s) of the planar spray so that electrical current is discharged to the face(s) of the spray. For oval sprays, one or more electrodes are located adjacent to the spray around the perimeter. The electrode(s) are located to effectively charge the spray. One or more auxiliary electrodes, which may be at a different voltage than the primary electrode(s) or electrically grounded, may be used to modify the electrical field or current between the primary electrode(s) and the spray. For example, a primary charging electrode may be on one side of the spray fan and a grounded insulated auxiliary electrode may by on the opposite side of the spray fan. Charging method (2) has the advantage of less current leakage through the admixed liquid mixture than charging method (1). Admixed liquid mixtures that are sufficiently conductive must have the feed supply and feed line insulated from electrical ground. In charging method (3) above, the spray is electrically charged farther away from the orifice and is more fully dispersed than in method (2). Therefore a larger system or network of external electrodes is usually required in order to effectively charge the spray. Therefore the method is less safe and less versatile. Also the distance between the electrodes and spray must be greater to avoid interfering with the spray. Therefore the charge applied to the spray is likely to be lower. But current leakage through the supply lines is eliminated. The spray is passed through or between electrified grids or arrays of external electrodes before the spray is deposited onto the substrate. The spray droplets are charged by ion bombardment from the electrical current discharged into air from the electrodes. The electrified grid may be one or several wire electrodes that extend across the spray area. Current can discharge from along the length of the electrodes. The electrified array may be one or several wire or pointed electrodes positioned around the spray area and which extend close to or into the spray such that current discharges from the ends of the electrodes.

The present invention can be used with high electrical voltage in the range of about 30 to about 150 kilovolts. Higher electrical voltages are favored to impart higher electrical charge to the spray to enhance attraction to the substrate, but the voltage level must be safe for the type of charging and spray gun used. For safety reasons, the voltage of hand spray guns is usually restricted to less than 70 kilovolts and the equipment is designed to automatically shut off the voltage when the current exceeds a safe level. Generally for hand spray guns the useful range of electrical current is between 20 and 200 microamperes and optimum results are obtained with coating formulations that have very low electrical conductivity, that is, very high electrical resistance. For automatic spray guns that are used remotely, higher voltages and electrical currents can be safely used than for hand spray guns. Therefore the voltage can exceed 70 kilovolts up to 150 kilovolts and the current can exceed 200 microamperes.

These methods of electrostatic charging are known to those who are skilled in the art of electrostatic spraying.

For electrostatic spraying, the substrate is preferably an electrical conductor such as metal. But substrates that are not conductors or semiconductors can also be sprayed. Preferably they are pretreated to create an electrically conducting surface. For instance, the substrate can be immersed in a special solution to impart conductivity to the surface.

The method of generating the high electrical voltage and electrical current is not critical to the practice of the current invention. Conventional high voltage electrical power supplies can be used. The power supply should have standard safety features that prevent current or voltage surges. The electrical power supply may be built into the spray gun. Other charging methods may also be used.

The spray pressure used is a function of the precursor coating composition, the supercritical fluid being used, and the viscosity of the liquid mixture. The minimum spray pressure is at or slightly below the critical pressure of the supercritical fluid. Generally, the pressure will be below 5000 psi. Preferably, the spray pressure is above the critical pressure of the supercritical fluid and below 3000 psi. If the supercritical fluid is supercritical carbon dioxide fluid, the preferred spray pressure is between 1070 psi and 3000 psi. The most preferred spray pressure is between 1200 psi and 2500 psi.

The spray temperature used is a function of the precursor coating composition, the supercritical fluid being used, and the concentration of supercritical fluid in the liquid mixture. The minimum spray temperature is at or slightly below the critical temperature of the supercritical fluid. The maximum temperature is the highest temperature at which the components of the liquid mixture are not significantly thermally degraded during the time that the liquid mixture is at that temperature.

If the supercritical fluid is supercritical carbon dioxide fluid, because the supercritical fluid escaping from the spray nozzle could cool to the point of condensing solid carbon dioxide and any ambient water vapor present due to high humidity in the surrounding spray environment, the spray composition is preferably heated prior to atomization. The minimum spray temperature is about 31° centigrade. The maximum temperature is determined by the thermal stability of the components in the liquid mixture. The preferred spray temperature is between 35° and 90° centigrade. The most preferred temperature is between 45° and 75° centigrade. Generally, liquid mixtures with greater amounts of supercritical carbon dioxide fluid require higher spray temperatures to counteract the greater cooling effect.

If supercritical carbon dioxide fluid is employed as the supercritical fluid diluent, it preferably should be present in amounts ranging from about 10 to about 60 weight percent based upon the total weight of the admixed coating composition containing the solids fraction, the solvent fraction, water and supercritical carbon dioxide, thereby producing a mixture having viscosities from about 5 centipoise to about 150 centipoise at spray temperature. Most preferably, it is present in amounts ranging from about 20 to about 60 weight percent on the same basis, thereby producing a mixture having viscosities from about 10 centipoise to about 50 centipoise at spray temperature.

The spray temperature may be obtained by heating the liquid mixture before it enters the spray gun, by heating the spray gun itself, by circulating the heated liquid mixture to or through the spray gun to maintain the spray temperature, or by a combination of methods. Circulating the heated liquid mixture through the spray gun is preferred, to avoid heat loss and to maintain the desired spray temperature. Tubing, piping, hoses, and the spray gun are preferably insulated or heat traced to prevent heat loss.

The environment into which the admixed coating composition is sprayed is not critical. However, the pressure therein must be less than that required to maintain the supercritical fluid component of the liquid spray mixture in the supercritical state. Preferably, the admixed liquid coating composition is sprayed in air under conditions at or near atmospheric pressure. Other gas environments can also be used, such as air with reduced oxygen content or inert gases such as nitrogen, carbon dioxide, helium, argon, xenon, or a mixture. Oxygen or oxygen enriched air is not desirable, because oxygen enhances the flammability of organic components in the spray.

Generally, liquid spray droplets are produced which generally have an average diameter of one micron or greater. Preferably, these droplets have average diameters of from about 5 to 1000 microns. More preferably, these droplets have average diameters of from about 10 to about 300 microns. Small spray droplets are desirable to vent the supercritical fluid from the spray droplet before impacting the substrate. Small spray droplets also give higher quality finishes.

The process of the present invention may be used to apply coatings by the application of liquid spray to a variety of substrates. Examples of suitable substrates include but are not limited to metal, wood, glass, plastic, paper, cloth, ceramic, masonry, stone, cement, asphalt, rubber, and composite materials.

Through the practice of the present invention, films may be applied to substrates such that the cured films have thicknesses of from about 0.2 to about 6.0 mils. Preferably, the films have thicknesses of from about 0.5 to about 2.0 mils, while most preferably, their thicknesses range from about 0.7 to about 1.5 mils.

If curing of the coating composition present upon the coated substrate is required, it may be performed at this point by conventional means, such as allowing for evaporation of the active and/or coupling solvent, application of heat or ultraviolet light, etc.

Compressed gas may be utilized to assist formation of the liquid spray and/or to modify the shape of the liquid spray that comes from the orifice. The assist gas is typically compressed air at pressures from 5 to 80 psi, with low pressures of 5 to 20 psi preferred, but may also be air with reduced oxygen content or inert gases such as compressed nitrogen, carbon dioxide, helium, argon, or xenon, or a mixture. Compressed oxygen or oxygen enriched air is not desirable because oxygen enhances the flammability of the organic components in the spray. The assist gas is directed into the liquid spray as one or more high-velocity jets of gas, preferably arranged symmetrically on each side of the liquid spray to balance each other. The assist gas jets will preferably come from gas orifices built into the electrostatic spray tip and/or nozzle. The assist gas may also issue from an opening in the spray tip or nozzle that is a concentric annular ring that is around and centered on the liquid orifice, to produce a hollow-cone high-velocity jet of gas that converges on the liquid spray, but this creates a larger flow of assist gas that is not as desirable. The concentric annular ring may be divided into segments, to reduce gas flow rate, and it may be elliptical instead of circular, to shape the spray. Preferably, the flow rate and pressure of the assist gas are lower than those used in air spray. The assist gas may be heated to counteract the rapid cooling effect of the supercritical fluid diluent in the spray. The preferred temperature of heated assist gas ranges from about 35° to about 90° centigrade. The most preferred temperature ranges from about 45° to about 75° centigrade.

Figure 3:
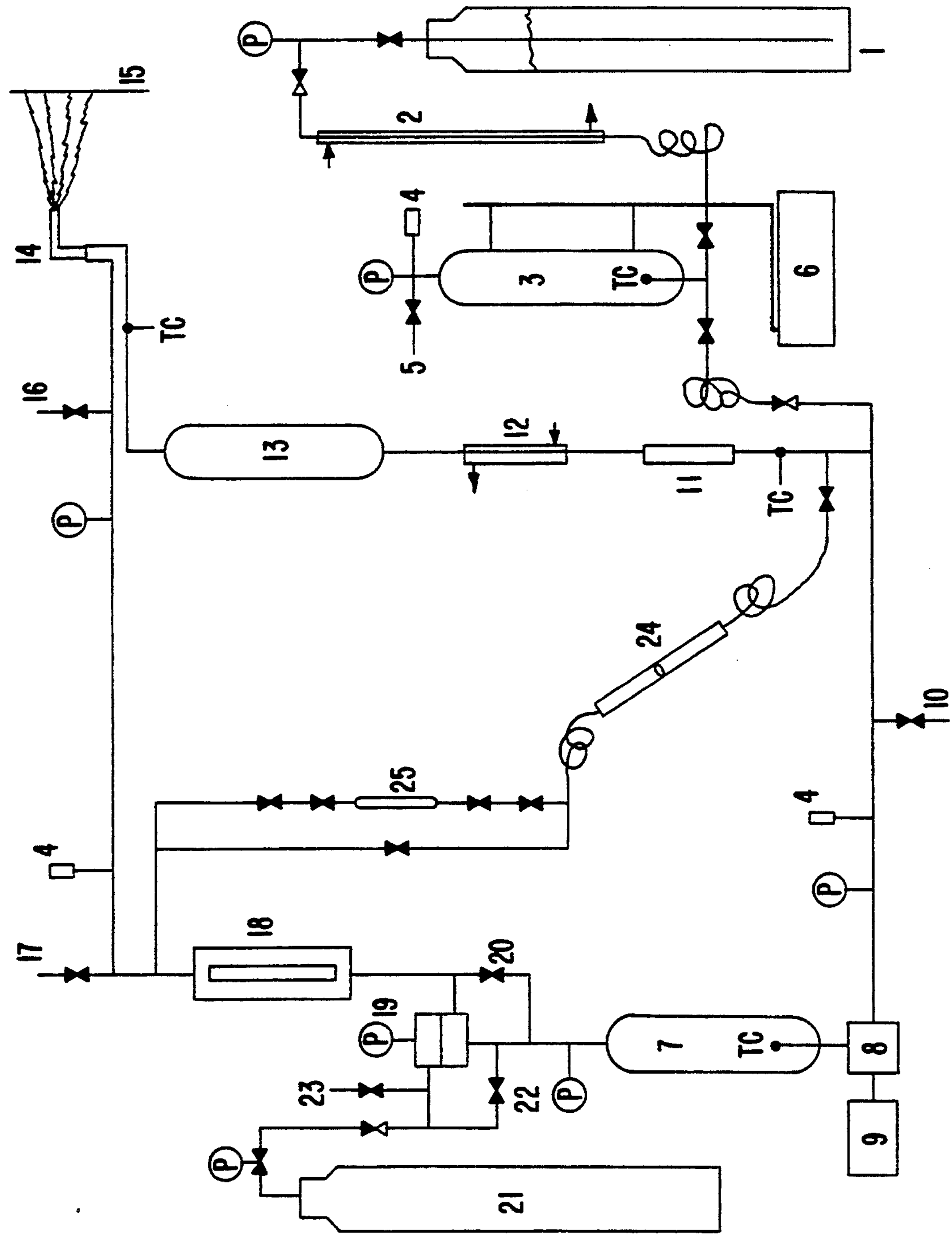
FIG. 3 is a schematic diagram of a spray apparatus that can be used with the precursor coating composition of the present invention.
Figure 4:
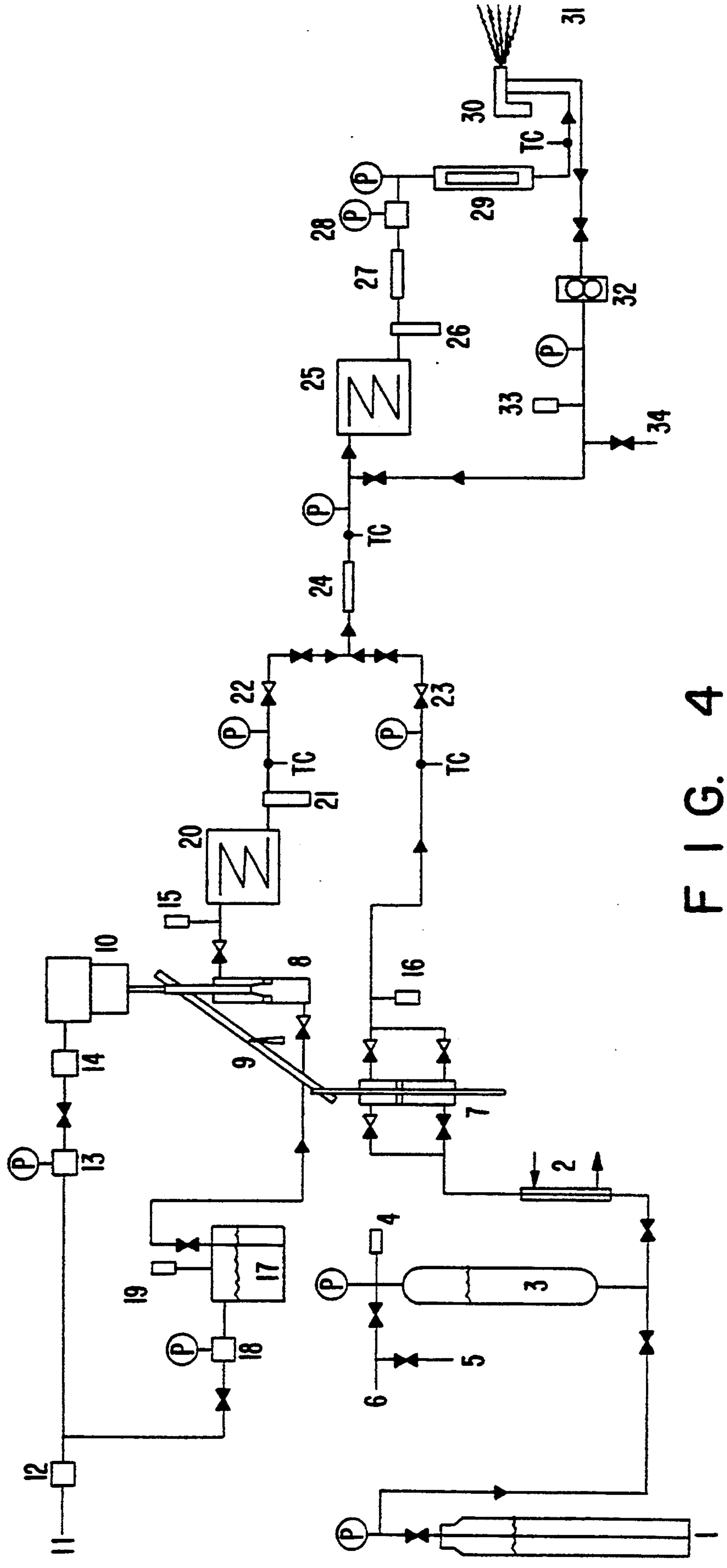
FIG. 4 is a schematic diagram of yet another spray apparatus that can be used with the precursor coating composition of the present invention.

The precursor coating composition of the present invention may be admixed with a supercritical fluid and then sprayed onto a substrate by a spray apparatus such as that shown in either FIGS. 3 or 4.

The following illustrates apparatus that may be used to obtain the admixed coating composition of precursor coating composition and supercritical fluid and spray it in a batch mode in the practice of the present invention. The supercritical fluid illustrated is supercritical carbon dioxide fluid.

Table 3 contains a listing of the equipment used in conducting the procedure described for the batch mode.

TABLE 3

| Item # | Description |
|---|---|
| 1. | Linde bone-dry-grade liquid carbon dioxide in size K cylinder with eductor tube. |
| 2. | Refrigeration heat exchanger. |
| 3. | Hoke cylinder #8HD3000, 3.0-liter volume, made of 304 stainless steel, having double end connectors, 1800-psig pressure rating, mounted on scale; carbon dioxide feed tank. |
| 4. | Circle Seal TM pressure relief valve P168-344-2000 set at 1800 psig. |
| 5. | Vent valve. |
| 6. | Sartorius 16-kilogram scale with 0.1-gram sensitivity. |
| 7. | Hoke cylinder #8HD2250, 2.25-liter volume, made of 304 stainless steel, having double end connectors, 1800-psig pressure rating; pump supply tank. |
| 8. | Zenith single-stream gear pump, model #HLB-5592-30CC, modified by adding a thin Grafoil TM gasket to improve metal-to-metal seal. |
| 9. | Zenith gear pump drive model #4204157, with 15:1 gear ratio, and pump speed controller #QM-371726F-15-XP, with speed range of 6 to 120 revolutions per minute. |
| 10. | Drain from circulation loop. |
| 11. | Kenics static mixer. |
| 12. | Cooling water heat exchanger. |
| 13. | Hoke cylinder #8HD2250, 2.25-liter volume, made of 304 stainless steel, having double end connectors, 1800-psig pressure rating; spray supply tank. |
| 14. | Airless spray gun. |
| 15. | Bonderite TM 37 polished 24-gauge steel panel, 6-inch by 12-inch size. |
| 16. | Vent valve. |
| 17. | Liquid feed valve. |
| 18. | Jerguson high-pressure sight glass series T-30 with window size #6 rated for 2260 psig pressure at 200° F. temperature. |
| 19. | Grove back-pressure regulator #5-90-W, rated for 2000 psig at 200° F. temperature; dome is charged with pressurized nitrogen to desired spray pressure. |
| 20. | Bypass valve. |
| 21. | Pressurized nitrogen to set Grove back-pressure regulator and to purge unit. |
| 22. | Nitrogen purge valve. |
| 23. | Nitrogen vent valve. |
| 24. | Ruska rolling-ball high-pressure viscometer |

TABLE 3-continued

| Item # | Description |
|---|---|
| | #1602-811-00 with temperature controller and electronic timer. |
| 25. | Pyncnometer, double-valved one-quarter-inch high-pressure tubing. |

The apparatus listed in Table 3 above is assembled as shown in the schematic representation contained in FIG. 3. Rigid connections are made with ⅛-inch diameter high-pressure tubing for gas flows and with ¼-inch diameter high-pressure tubing for liquid flows, using Swagelok TM fittings. The spray gun is connected to the tubing by using two Graco flexible ¼-inch static-free nylon high-pressure hoses model #061-214 with 5000-psi pressure rating. Check valves are used to prevent back flow to the carbon dioxide feed tank (3) and bulk supply tank (1) and to the nitrogen cylinder (21). The circulation loop and carbon dioxide feed tank are protected from overpressurization by pressure relief valves (4).

The apparatus consists of a circulation loop, a carbon dioxide feed system, and a side loop to measure viscosity and density. The circulation loop contains a pump supply tank (7), a gear pump (8) to provide circulation and maintain constant spray pressure, a static mixer (11), a cooler (12) to remove excess heat, a spray supply tank (13), an airless spray gun (14), a sight glass (18), and a pressure regulator (19) to maintain constant spray pressure. The pressure regulator (19) is set by using compressed nitrogen (21) regulated to the desired flow pressure. The carbon dioxide feed system contains a carbon dioxide bulk supply cylinder (1), a refrigeration heat exchanger (2), and a carbon dioxide feed tank (3) mounted on an electronic scale (6). The feed and exit lines to the feed tank (3) are coiled so that the force of the tank moving on the scale does not affect the scale reading. The side loop contains a viscometer (24) and pyncnometer (25) for measuring the viscosity and density of the admixed coating composition, if desired.

All flow lines and tanks are lined with electrical heat tape and covered with insulation to heat the solution to spray temperature. The heat tape is divided into several circuits that are controlled independently:

Circuit #1 Pressure regulator (19), bypass line (20), sight glass (18), and connecting lines.

Circuit #2 Pump supply tank (7), gear pump (8), and line in circulation loop to carbon dioxide feed point.

Circuit #3 Line in circulation loop from carbon dioxide feed point to cooler (12).

Circuit #4 Spray supply tank (13).

Circuit #5 Line from spray supply tank (13) to flexible hose connected to spray gun (14).

Circuit #6 Carbon dioxide feed tank (3).

Thermocouples located within the tanks and lines measure temperature. Admixed coating composition temperature is kept uniform around the loop by rapid circulation and by adjusting the heat tapes.

The batch spray unit is filled by the following procedure. The unit is evacuated through the circulation loop vent (16) and a weighed amount of precursor coating composition is added through the feed valve (17) with the gear pump (8) circulating the material at a slow rate through the pressure regulator bypass valve (20). The carbon dioxide feed tank (3) is evacuated through the vent valve (5) and filled with liquid carbon dioxide from the carbon dioxide supply cylinder (1). To make filling the feed tank (3) easier, the carbon dioxide is passed through a refrigeration heat exchanger (2), so that the vapor pressure in the feed tank (3) is lower than the vapor pressure in the supply tank (1). The desired mass of carbon dioxide is pressurized into the circulation loop by heating the carbon dioxide feed tank (3) and valving in the desired amount as read on the balance (6).

The spray pressure is generated by filling the unit with precursor coating composition and carbon dioxide to the required overall density and then heating it to the spray temperature. Prior to spraying, the pressure regulator (19) is bypassed (20) and the loop is at a uniform pressure. To prepare for spraying, the bypass (20) is closed so that the flow goes through the pressure regulator (19), which is adjusted to the flow pressure. During spraying, the spray pressure is kept constant by the gear pump (8) and the pressure regulator (19). The gear pump (8) pumps solution into the spray supply tank (13) from the pump supply tank (7) at a high circulation rate. The pressure regulator (19) discharges excess solution back into the pump supply tank (7). The pump supply tank (7) loses inventory and pressure, but the spray supply tank (13) is kept full and at spray pressure.

The following illustrates apparatus that may be used to obtain the admixed coating composition of precursor coating composition and supercritical fluid and spray it in a continuous mode in the practice of the present invention. The supercritical fluid illustrated is supercritical carbon dioxide fluid.

Table 4 contains a listing of the equipment used in conducting the procedure described for the continuous mode.

TABLE 4

| Item # | Description |
|---|---|
| 1. | Linde bone-dry-grade liquid carbon dioxide in size K cylinder with eductor tube. |
| 2. | Refrigeration heat exchanger. |
| 3. | Hoke cylinder #8HD3000, 3.0-liter volume, made of 304 stainless steel, having double end connectors, 1800-psig pressure rating. |
| 4. | Circle Seal TM pressure relief valve P168-344-2000 set at 1800 psig. |
| 5. | Vent valve. |
| 6. | Nitrogen gas supply. |
| 7. | Graco double-acting piston pump model #947-963 with 4-ball design and Teflon TM packings mounted in #5 Hydra-Cat Cylinder Slave Kit #947-943; pump and feed line are refrigeration traced; carbon dioxide pump. |
| 8. | Graco standard double-acting primary piston pump model #207-865 with Teflon TM packings; coating concentrate pump. |
| 9. | Graco Variable Ratio Hydra-Cat TM Proportioning Pump unit model #226-936 with 0.9:1 to 4.5:1 ratio range. |
| 10. | Graco President air motor model #207-352. |
| 11. | Utility compressed air at 95 psig supply pressure. |
| 12. | Graco air filter model #106-149. |
| 13. | Graco air pressure regulator model #206-197. |
| 14. | Graco air line oiler model #214-848. |
| 15. | Graco pressure relief valve model #208-317 set at 3000 psig. |
| 16. | Graco pressure relief valve model #208-317 set at 3000 psig. |
| 17. | Graco two-gallon pressure tank model #214-833. |
| 18. | Graco air pressure regulator model #171-937. |
| 19. | Graco pressure relief valve model #103-437 set at 100 psig. |
| 20. | Graco high-pressure fluid heater model #226-816. |
| 21. | Graco high-pressure fluid filter model #218-029. |

TABLE 4-continued

| Item # | Description |
|---|---|
| 22. | Graco check valve model #214-037 with Teflon TM seal. |
| 23. | Graco check valve model #214-037 with Teflon TM seal. |
| 24. | Graco static mixer model #500-639. |
| 25. | Graco high-pressure fluid heater model #226-816. |
| 26. | Graco high-pressure fluid filter model #218-029. |
| 27. | Kenics static mixer. |
| 28. | Graco fluid pressure regulator model #206-661. |
| 29. | Jerguson high-pressure sight glass series T-30 with window size #6 rated for 2260 psig pressure at 200° F. temperature. |
| 30. | Airless spray gun. |
| 31. | Bonderite TM 37 polished 24-gauge steel panel, 6-inch by 12-inch size. |
| 32. | Zenith single-stream gear pump, model #HLB-5592-30C, modified by adding a thin Grafoil TM gasket to improve metal-to-metal seal, with pump drive model #4204157, with 15:1 gear ratio, and pump speed controller model #QM-371726F-15-XP, with speed range of 6 to 120 revolutions per minute. |
| 33. | Circle Seal TM pressure relief valve P168-344-2000 set at 2000 psig. |
| 34. | Drain from circulation loop. |

The apparatus listed in Table 4 above is assembled as shown in the schematic representation contained in FIG. 4. Rigid connections were made with Dekuron ¼-inch diameter, 0.036-inch thick, seamless, welded, type 304 stainless steel hydraulic tubing ASTM A-269 with 5000-psi pressure rating, using Swagelok TM fittings. The pressure tank (17) is connected to the pump (8) using a Graco ⅜-inch static-free nylon high-pressure hose model #061–221 with 3000-psi pressure rating. All other flexible connections are made using Graco ¼-inch static-free nylon high-pressure hoses model #061–214 with 5000-psi pressure rating.

The precursor coating composition and carbon dioxide are pumped and proportioned by using a Graco Variable Ratio Hydra-Cat TM Proportioning Pump unit (9). It proportions two fluids together at a given volume ratio by using two piston pumps (7 and 8) that are slaved together. The piston rods for each pump are attached to opposite ends of a shaft that pivots up and down on a center fulcrum. The volume ratio is varied by sliding pump (7) along the shaft, which changes the stroke length. The pumps are driven on demand by an air motor (10). Pumping pressure is controlled by the air pressure that drives the air motor. The pumps are double-acting; they pump on upstroke and downstroke. The primary pump (8) is used to pump the precursor coating composition. It is of standard design, having one inlet and one outlet. It fills through a check valve at the bottom and discharges through a check valve at the top. A third check valve is located in the piston head, which allows liquid to flow from the bottom compartment to the top compartment when the piston is moving downward. This type of pump is designed to be used with low feed pressure, typically below 100 psi. The precursor coating composition is supplied to the primary pump (8) from a two-gallon pressure tank (17). After being pressurized in the pump to spray pressure, the precursor coating composition is then heated in an electric heater (20) to reduce its viscosity (to aid mixing with carbon dioxide), filtered in a fluid filter (21) to remove particulates, and fed through a check valve (22) into the mix point with carbon dioxide. The secondary pump (7) on the proportioning pump unit (9) is used to pump the liquid carbon dioxide. A double-acting piston pump (7) with a four-check-valve design is used because of the high vapor pressure of carbon dioxide. The pump has an inlet and an outlet on each side of the piston; no flow occurs through the piston. The proportion of carbon dioxide pumped into the admixed coating composition is varied by moving the secondary pump (7) along the moving shaft. Bone-dry-grade liquid carbon dioxide is pumped from cylinder (1) through refrigeration heat exchanger (2) to secondary pump (7). For measuring the carbon dioxide uptake rate, the carbon dioxide is pumped from Hoke cylinder (3) through heat exchanger (2) to pump (7). The liquid carbon dioxide is refrigerated in heat exchanger (2) in order to lower the vapor pressure, to prevent cavitation in pump (7). The Hoke cylinder (3) is filled from cylinder (1). Air or gaseous carbon dioxide in the cylinder (3) is vented (5) during filling. The Hoke cylinder (3) is mounted on a 16-kilogram Sartorius electronic scale with 0.1-gram sensitivity so that the amount of carbon dioxide in it can be weighed. After being pressurized to spray pressure in pump (7), the liquid carbon dioxide is fed unheated through check valve (23) to the mix point with the precursor coating composition. After the precursor coating composition and carbon dioxide are proportioned together at the mix point, the admixed coating composition is mixed in static mixer (24) and pumped on demand into a circulation loop, which circulates the admixed coating composition at spray pressure and temperature to or through the spray gun (30). The admixed coating composition is heated in an electric heater (25) to obtain the desired spray temperature and filtered in a fluid filter (26) to remove particulates. Fluid pressure regulator (28) is installed to lower the spray pressure below the pump pressure, if desired, or to help maintain a constant spray pressure. A Jerguson sight glass (29) is used to examine the phase condition of the admixed coating composition. Circulation flow in the circulation loop is obtained through the use of gear pump (32).

The pressure tank (17) is filled with the precursor coating concentrate and pressurized with air to 50 psig. The primary pump (8) is primed by opening a drain valve on the bottom of filter (21) until air was purged from the line.

The carbon dioxide secondary pump (7) is positioned along the pivoting shaft to give the desired percentage of maximum piston displacement. The refrigeration flow is adjusted to a temperature of −10° C. and circulated through the refrigeration heat exchanger (2) and the refrigeration tracing on pump (7). The carbon dioxide feed line and circulation loop are filled with carbon dioxide and vented through valve (34) several times to purge air from the system. Then the valves to the mixing point are closed and the carbon dioxide feed line is filled to prime pump (7).

The air pressure regulator (13) is adjusted to supply the air motor (10) with air at the desired pressure to pressurize the feed lines. The valves to the mix point are opened and the circulation loop filled with material. With the circulation loop return valve closed, to give plug flow around the circulation loop with no backmixing, material is drained from valve (34) until a uniform composition is obtained. Heater (20) is adjusted to give a feed temperature of 37° C. The circulation heater (25) is adjusted to give the spray temperature. The circulation loop return valve is opened and the spray mixture is circulated at a high rate by adjusting the gear pump (32). The carbon dioxide content of the admixed coating composition is measured by measuring the carbon dioxide uptake rate from Hoke cylinder (3) and the precursor coating composition uptake rate from pressure tank (17) while spraying through the spray gun. Then the carbon dioxide feed is switched back to supply cylinder (1).

An alternative method of proportioning the precursor coating composition and supercritical fluid in a continuous mode uses a mass proportionation apparatus instead of the volumetric proportionation apparatus illustrated above. The variable ratio proportioning pump unit (9) with pumps (7) and (8) shown in FIG. 4 is replaced with an apparatus having the following elements. For pumping the carbon dioxide, the double-acting four-ball piston pump (7) is driven individually on demand by attaching air motor (10) directly to it instead of being driven by the moving beam. Alternatively, the carbon dioxide can be pumped by using an air-driven cryogenic pump such as Haskel model DSF-35, which is a single-acting pump that utilizes a three-way cycling spool that is designed for pumping liquefied gases under pressure without requiring refrigeration to avoid cavitation. The pressurized carbon dioxide is then passed through a pressure regulator, which is used to control the desired spray pressure, and then through a mass-flow meter, such as Micro Motion model D6, which measures the flow rate of carbon dioxide as it is pumped on demand. For pumping the precursor coating composition, the standard double-acting primary piston pump (8) is replaced with a variable speed gear pump, such as the Zenith gear pump (32) that is used in the circulation loop. The gear pump pumping rate is controlled by a signal processor that receives the instantaneous carbon dioxide flow rate from the mass flow meter and then controls the gear pump revolution rate to pump the precursor coating composition at the proper flow rate to give the desired proportion of precursor coating composition and carbon dioxide in the admixed coating composition. An accumulator, such as Tobul model 4.7A30-4, may be installed in the circulation loop to increase the loop capacity and to minimize pressure pulsations in the loop when the spray gun is activated.

EXAMPLES

Examples 1–3

In Examples 1–3, the organic solvent of a precursor coating composition containing a water-reducible alkyd as the polymeric coating component is progressively replaced with larger amounts of water to determine the amount of supercritical carbon dioxide that can be added to each of these compositions and to demonstrate that this amount, even after water addition, remains substantially the same.

EXAMPLE 1

As a control case containing no water, 135.2 grams of a water-reducible tall oil fatty acid alkyd resin (Cargill 7451, manufactured by Cargill, Inc. which is supplied as a 70% solution in butoxy ethanol) containing 94.6 grams of polymer and 40.6 grams of butoxy ethanol; an additional 10.8 grams of butoxy ethanol is added to increase the coupling solvent used in the composition (total butoxy ethanol coupling solvent=51.4 grams); and 16.8 grams of Cymel ® 303, a cross-linker manufactured by American Cyanamid Co. are admixed with supercritical carbon dioxide over a pressure range of 1,100 psi to 2,600 psi and a temperature range of 35° C. to 55° C.

The maximum amount of supercritical carbon dioxide that can be added to this "dry" admixture and still provide a clear, single phase is 27% by weight based on the total weight of all of the components of the admixture.

EXAMPLE 2

In this example, 10% by weight of the organic solvent present in the precursor composition of Example 1 is replaced with water.

Accordingly, Example 1 is repeated with the exception that 5.0 grams of distilled water is substituted for 5.0 grams of butoxy ethanol.

The maximum amount of supercritical carbon dioxide that can now be added and still provide a clear, single phase is 26% by weight based on the total weight of all of the components of the admixture.

EXAMPLE 3

In this example, 20% by weight of the organic solvent present in the precursor composition of Example 1 is replaced with water.

Accordingly, Example 1 is repeated with the exception that 10.0 grams of distilled water is substituted for 10.0 grams of butoxy ethanol.

The maximum amount of supercritical carbon dioxide that the solution can tolerate and avoid phase separation due to saturation with supercritical carbon dioxide is 27% by weight based on the total weight of all components. Unlike Examples 1 and 2, substantial clouding of the solution develops above 12% by weight of supercritical carbon dioxide indicating a phase separation beginning to occur. However, the onset of such clouding does not hinder the spraying performance of this composition.

Examples 4–7

In Examples 4–7, the effects of (1) replacing organic solvent with water, and (2) adding water to the solvent fraction existing in a precursor composition containing a water-reducible polyester as the polymeric coating component are demonstrated.

EXAMPLE 4

As a control case containing no water, 100.0 grams of a water-reducible oil free polyester resin (Cargill 7203, manufactured by Cargill, inc.. which is supplied as a 75% solution in 2-butanol:butoxy ethanol in a ratio of 2.97:1) containing 75.0 grams of polymer, 18.7 grams of 2-butanol and 6.3 grams of butoxy ethanol; an additional 25.0 grams of butoxy ethanol is added to increase the coupling solvent used in the composition (total butoxy ethanol coupling solvent=31.3 grams); and 25.0 grams of Cymel ® 303 are admixed with supercritical carbon dioxide over the same temperature and pressure ranges set forth in Example 1.

The maximum amount of supercritical carbon dioxide that the solution can tolerate, remain clear, and avoid phase separation due to saturation with supercritical carbon dioxide is 31 wt % based on the total weight of all components.

EXAMPLE 5

As yet another control case containing no water, Example 4 is repeated with the exception that the total amount of butoxy ethanol is reduced by 5.0 grams. The maximum amount of supercritical carbon dioxide that the solution can tolerate, remain clear, and avoid phase separation due to saturation with supercritical carbon dioxide is 30% by weight based on total weight of all components.

EXAMPLE 6

In this example, 10% by weight of the organic solvent present in the precursor composition of Example 4 is replaced with water, which example is also equivalent to adding 11% by weight of water based on the total weight of organic solvent to the precursor composition of Example 5.

Accordingly, Example 4 is repeated with the exception that 5.0 grams of distilled water is substituted for 5.0 grams of butoxy ethanol. Example 5 is also repeated except that 5.0 grams of water is added to the composition.

In each instance, the maximum amount of supercritical carbon dioxide that the solution can tolerate, remain clear, and avoid phase separation due to saturation with supercritical carbon dioxide is 29% by weight based on the total weight of all of the components.

In the example, 20% by weight of the organic solvent present in the precursor composition of Example 4 is replaced with water.

Accordingly, Example 4 is repeated with the exception that 10.0 grams of distilled water is substituted for 10.0 grams of butoxy ethanol. The maximum amount of supercritical carbon dioxide that the solution can tolerate, remain clear, and avoid phase separation due to saturation with supercritical carbon dioxide is 25%. Unlike Examples 4–6, substantial clouding of the solution develops above 15% by weight of supercritical carbon dioxide indicating phase separation beginning to occur. However, the onset of such clouding does not hinder the spraying performance of this composition.

Examples 8–11

In Examples 8–11, the organic solvent of a precursor coating composition containing a conventional polyester resin as the polymeric component is progressively replaced with larger amounts of water to determine the amount of supercritical carbon dioxide that can be added to each of these compositions and to demonstrate that this amount, even after water addition, remains substantially the same.

EXAMPLE 8

As a control case containing no water, 75.0 grams of an oil free polyester resin (Cargill 5780, manufactured by Cargill, Inc. in solvent free form); 50.0 grams of butoxy ethanol; and 25.0 grams of Cymel® 303 are admixed with supercritical carbon dioxide over the same temperature and pressure ranges set forth in Example 1.

The maximum amount of supercritical carbon dioxide that the solution can tolerate, remain clear, and avoid phase separation due to saturation with supercritical carbon dioxide is 32 wt % based on the total weight of all components.

EXAMPLE 9

In this example, 10% by weight of the organic solvent present in the precursor composition of Example 8 is replaced with water.

Accordingly, Example 8 is repeated with the exception that 5.0 grams of distilled water is substituted for 5.0 grams of butoxy ethanol.

The maximum amount of supercritical carbon dioxide that can now be added and still provide a clear, single phase is 32% by weight based on the total weight of all of the components of the admixture.

EXAMPLE 10

In this example, 20% by weight of the organic solvent present in the precursor composition of Example 8 is replaced with water.

Accordingly, Example 8 is repeated with the exception that 10.0 grams of distilled water is substituted for 10.0 grams of butoxy ethanol.

The maximum amount of supercritical carbon dioxide that the solution can tolerate, remain clear, and avoid phase separation due to saturation with supercritical carbon dioxide is 28 wt % based on the total weight of all components. Moderate clouding of the solution occurs above 23% by weight of supercritical carbon dioxide. This indicates that a very small amount of phase separation is occurring.

EXAMPLE 11

In this example, 30% by weight of the organic solvent present in the precursor composition of Example 8 is replaced with water.

Accordingly, Example 8 is repeated with the exception that 15.0 grams of distilled water is substituted for 15.0 grams of butoxy ethanol.

The maximum amount of supercritical carbon dioxide that the solution can tolerate and avoid phase separation due to saturation with supercritical carbon dioxide is 26% by weight based on the total weight of all components. Clouding of the solution develops upon the first addition of supercritical carbon dioxide indicating that an undesirable phase separation is occurring.

Examples 12–14

Examples 12–14 illustrate the desirability of using a coupling solvent (butoxy ethanol) in the precursor composition when water is present.

EXAMPLE 12

This example shows the effect of replacing 25 wt % of the coupling solvent in Example 10 with a non-coupling active solvent, ethyl 3-ethoxypropionate.

Example 10 is repeated with the exception that 10.0 grams of ethyl 3-ethoxypropionate is substituted for 10.0 grams of butoxy ethanol. The maximum amount of supercritical carbon dioxide that the solution can tolerate and avoid phase separation due to saturation with supercritical carbon dioxide is 28% by weight based on the total weight of all components. Substantial clouding of the solution develops above 26% by weight of supercritical carbon dioxide indicating that phase separation is beginning to occur.

EXAMPLE 13

This example shows the effect of replacing 50 wt % of the coupling solvent in Example 10 with a non-coupling active solvent, ethyl 3-ethoxypropionate.

Example 10 is repeated with the exception that 20.0 grams of ethyl 3-ethoxypropionate is substituted for 20.0 grams of butoxy ethanol. The maximum amount of supercritical carbon dioxide that the solution can tolerate and avoid phase separation due to saturation with supercritical carbon dioxide is 25% by weight based on the total weight of all components. Substantial clouding of the solution develops upon the first addition of supercritical carbon dioxide indicating an undesirable phase separation is occurring.

EXAMPLE 14

This example shows the effect of replacing all of the coupling solvent in Example 10 with a non-coupling active solvent, ethyl 3-ethoxypropionate.

Example 10 is repeated with the exception that 40.0 grams of ethyl 3-ethoxypropionate is substituted for all 40.0 grams of butoxy ethanol. A two phase mixture forms before any supercritical carbon dioxide is added. It is known that ethyl -ethoxypropionate unlike butoxy ethanol is immiscible in water; however, it is a solvent structurally related to 2-ethoxyethyl acetate which has significant water solubility. Thus ethyl 3-ethoxypropionate is polar enough to be close to the boundary separating water miscible and immiscible solvents. The maximum amount of supercritical carbon dioxide that the two phase mixture can tolerate and avoid additional phase separation due to saturation with supercritical carbon dioxide is 26% by weight based on the weight of all components.

The above examples show that despite the low water solubility of carbon dioxide, it is possible to replace some of the organic solvent with water in coatings formulations using both water-reducible and conventional resins and obtain mixtures which are suitable for admixture with supercritical fluids, such as supercritical carbon dioxide.

Both advantages of water addition are feasible. Water can be added to a coating formulation to reduce the viscosity while maintaining the amount of organic solvent constant (e.g., Examples 4 and 5). Moreover, water can also be substituted for organic solvent to lower the amount of overall solvent present in a coating while still maintaining the viscosity level (e.g., Examples 4 and 6).

A sufficient amount of a coupling solvent is desired to couple the water into the organic coating, but once there is a sufficient amount of such coupling solvent, the water can be used to further dilute the coating for viscosity reduction to enable spraying.

What is claimed is:

1. A precursor coating composition suitable for admixture with at least one supercritical fluid which admixture is then to be sprayed comprising a liquid mixture of:

(a) a solids fraction containing at least one polymeric compound capable of forming a coating on a substrate; and (b) a solvent fraction containing at least one coupling solvent in which said at least one polymeric compound is at least partially soluble and which is at least partially miscible with water, said solvent fraction having a composition containing a weight % solvent distribution and relative evaporation rates of:

| Wt % of Total Solvent Fraction | RER |
|---|---|
| 30-100% | <50 |
| 0-70% | 50-100 |
| 0-40% | 101-250 |
| <10% | >250 |

and said coupling solvent being selected from the group consisting of ethylene glycol ethers, propylene glycol ethers, lactams, cyclic ureas, and mixtures thereof; and (c) water, which is present in an amount of less than about 30% by weight based on the weight of the solvent fraction;

said liquid mixture having:

(i) a viscosity of less than about 6,000 centipoise and having less than about 400 grams of the solvent fraction per liter of mixture;

(ii) a solubility with at least one supercritical fluid, above the critical temperature and pressure of the supercritical fluid, of greater than 5% by weight of supercritical fluid in said mixture;

(iii) a viscosity of less than about 300 centipoise when admixed with a sufficient amount of the at least one supercritical fluid, above the critical temperature and pressure of the supercritical fluid, so as to render the mixture suitable for spray application; and (iv) a solubility with the supercritical fluid in the non-supercritical state, at 25° C. and one atmosphere absolute pressure of said fluid, of less than about 0.8% by weight of fluid in said mixture.

2. The precursor composition of claim 1, wherein the coupling solvent is selected from the group consisting of butoxy ethanol, propoxy ethanol, hexoxy ethanol, isoproproxy 2-propanol, butoxy 2-propanol, propoxy 2-propanol, tertiary butoxy 2-propanol, ethoxy ethanol, butoxy ethoxy ethanol, propoxy ethoxy ethanol, hexoxy ethoxy ethanol, methoxy ethanol, methoxy 2-propanol, ethoxy ethoxy ethanol, n-methyl-2-pyrrolidone, dimethyl ethylene urea, and mixtures thereof.

3. A precursor coating composition suitable for admixture with at least one supercritical fluid which admixture is then to be sprayed comprising a liquid mixture of:

(a) a solids fraction containing at least one polymeric compound capable of forming a coating on a substrate; and (b) a solvent fraction containing at least one coupling solvent in which said at least one polymeric compound is at least partially soluble and which is at least partially miscible with water, and containing at least one active solvent in which said polymeric compound is at least partially soluble and which is at least partially miscible with the supercritical fluid, said solvent fraction having a composition containing a weight % solvent distribution and relative evaporation rates of:

| Wt % of Total Solvent Fraction | RER |
|---|---|
| 30-100% | <50 |
| 0-70% | 50-100 |
| 0-40% | 101-250 |
| <10% | >250 |

and said coupling solvent being selected from the group consisting of ethylene glycol ethers, propylene glycol ethers, lactams, cyclic ureas, and mixtures thereof; and (c) water, which is present in an amount of less than about 30% by weight based on the weight of the solvent fraction;

said liquid mixture having:

(i) a viscosity of less than about 6000 centipoise and having less than about 400 grams of the solvent fraction per liter of mixture;

(ii) a solubility with supercritical fluid, above the critical temperature and pressure of the supercritical fluid, of greater than 5% by weight of supercritical fluid in said mixture;

(iii) a viscosity of less than about 300 centipoise when admixed with a sufficient amount of the at least one supercritical fluid, above the critical temperature and pressure of the supercritical fluid, so as to render the mixture suitable for spray application; and (iv) a solubility with the supercritical fluid in the non-supercritical state, at 25° C. and one atmosphere absolute pressure of said fluid, of less than about 0.8% by weight of fluid in said mixture.

* * * * *